US009143822B2

(12) United States Patent
Lee et al.

(10) Patent No.: US 9,143,822 B2
(45) Date of Patent: Sep. 22, 2015

(54) METHOD FOR TRANSCEIVING A BROADCAST SIGNAL AND BROADCAST-RECEIVING USING SAME

(75) Inventors: Hyeonjae Lee, Seoul (KR); Kwansuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/503,796

(22) PCT Filed: Oct. 18, 2010

(86) PCT No.: PCT/KR2010/007124
§ 371 (c)(1),
(2), (4) Date: Jul. 30, 2012

(87) PCT Pub. No.: WO2011/049337
PCT Pub. Date: Apr. 28, 2011

(65) Prior Publication Data

US 2012/0284749 A1 Nov. 8, 2012

Related U.S. Application Data

(60) Provisional application No. 61/254,742, filed on Oct. 25, 2009.

(51) Int. Cl.
*H04N 7/20* (2006.01)
*H04N 5/50* (2006.01)
(Continued)

(52) U.S. Cl.
CPC ........... *H04N 21/435* (2013.01); *H04N 21/235* (2013.01); *H04N 21/2362* (2013.01);
(Continued)

(58) Field of Classification Search
CPC .................................................... H04N 21/462
USPC ........... 725/45, 113, 136, 11, 112, 51, 90, 44, 725/109, 40
See application file for complete search history.

(56) References Cited

U.S. PATENT DOCUMENTS 5,818,441 A * 10/1998 Throckmorton et al. ..... 715/717
5,918,039 A * 6/1999 Buswell et al. ................. 703/27
(Continued)

FOREIGN PATENT DOCUMENTS

EP 0817105 A2 1/1998
EP 0957598 A2 11/1999
(Continued)

OTHER PUBLICATIONS

"Digital Video Broadcasting (DVB); Guidelines on implementation and usage of Service Information (SI)"; European Broadcasting Union; ETSI TR 101 211 V1.8.1 (Aug. 1, 2007), XP014039694, ISSN: 0000-0001.

*Primary Examiner* — Pankaj Kumar
*Assistant Examiner* — Reuben M Brown
(74) *Attorney, Agent, or Firm* — McKenna Long & Aldridge LLP

(57) ABSTRACT

The present invention relates to a method and apparatus for transceiving a broadcast signal. A method for receiving a broadcast signal comprises the following steps: extracting, from the received broadcast signal, a broadcast stream including at least one program, first program table information for indicating the broadcast stream, and second program table information for indicating the correlation among a plurality of programs provided using at least one broadcast service; parsing the broadcast stream using the extracted first program table information; and acquiring, using the extracted second program table information, information on the group to which the plurality of programs belong.

11 Claims, 41 Drawing Sheets

(51) Int. Cl.

| | |
|---|---|
| ***H04N 21/435*** | (2011.01) |
| ***H04N 21/235*** | (2011.01) |
| ***H04N 21/2362*** | (2011.01) |
| ***H04N 21/434*** | (2011.01) |
| ***H04N 21/45*** | (2011.01) |
| ***H04N 21/472*** | (2011.01) |
| ***H04N 21/482*** | (2011.01) |
| ***H04N 21/643*** | (2011.01) |
| ***H04N 21/84*** | (2011.01) |
| ***H04N 21/858*** | (2011.01) |
| *H04N 5/445* | (2011.01) |

(52) U.S. Cl.

CPC ....... *H04N21/4345* (2013.01); *H04N 21/4349* (2013.01); *H04N 21/4508* (2013.01); *H04N 21/4532* (2013.01); *H04N 21/47214* (2013.01); *H04N 21/482* (2013.01); *H04N 21/643* (2013.01); *H04N 21/84* (2013.01); *H04N 21/858* (2013.01); *H04N 21/8586* (2013.01)

(56) References Cited

U.S. PATENT DOCUMENTS

| | | | | | |
|---|---|---|---|---|---|
| 6,031,577 | A | * | 2/2000 | Ozkan et al. | 348/465 |
| 6,249,320 | B1 | * | 6/2001 | Schneidewend et al. | 348/569 |
| 6,505,347 | B1 | * | 1/2003 | Kaneko et al. | 725/39 |
| 7,536,706 | B1 | * | 5/2009 | Sezan et al. | 725/113 |
| 7,720,103 | B2 | * | 5/2010 | Kwak | 370/486 |
| 8,099,752 | B2 | * | 1/2012 | Eyer | 725/48 |
| 8,549,562 | B2 | * | 10/2013 | Kim et al. | 725/54 |
| 2004/0139200 | A1 | * | 7/2004 | Rossi et al. | 709/228 |
| 2005/0240963 | A1 | | 10/2005 | Preisman et al. | |
| 2007/0277208 | A1 | | 11/2007 | Asbun et al. | |
| 2008/0115148 | A1 | * | 5/2008 | Paila | 719/316 |
| 2008/0268829 | A1 | | 10/2008 | Taylor et al. | |
| 2009/0207839 | A1 | * | 8/2009 | Cedervall et al. | 370/390 |
| 2009/0228928 | A1 | * | 9/2009 | Lee et al. | 725/55 |
| 2009/0268806 | A1 | * | 10/2009 | Kim et al. | 375/240.01 |
| 2010/0154000 | A1 | * | 6/2010 | Macrae et al. | 725/41 |
| 2011/0055885 | A1 | * | 3/2011 | Klappert et al. | 725/113 |
| 2011/0081965 | A1 | * | 4/2011 | Klein et al. | 463/31 |
| 2012/0272270 | A1 | * | 10/2012 | Boyer et al. | 725/39 |
| 2014/0059592 | A1 | * | 2/2014 | Olague et al. | 725/32 |

FOREIGN PATENT DOCUMENTS

| | | | |
|---|---|---|---|
| EP | 2077633 | A2 | 7/2009 |
| KR | 10-2007-0040008 | | 4/2007 |
| KR | 10-2007-0115121 | | 12/2007 |
| KR | 10-2009-0060915 | | 6/2009 |

* cited by examiner

FIG. 6

| Syntax | Bits | Format |
|---|---|---|
| terrestrial_virtual_channel_table_section () { | | |
| table_id | 8 | 0xC8 |
| section_syntax_indicator | 1 | '1' |
| private_indicator | 1 | '1' |
| zero | 2 | '00' |
| section_length | 12 | uimsbf |
| transport_stream_id | 16 | uimsbf |
| reserved | 2 | '11' |
| version_number | 5 | uimsbf |
| current_next_indicator | 1 | bslbf |
| section_number | 8 | uimsbf |
| last_section_number | 8 | uimsbf |
| protocol_version | 8 | uimsbf |
| num_channels_in_section | 8 | uimsbf |
| for(i=0; i<num_channels_in_section;i++) { | | |
| short_name | 7*16 | unicode™ BMP |
| reserved | 4 | '1111' |
| major_channel_number | 10 | uimsbf |
| minor_channel_number | 10 | uimsbf |
| modulation_mode | 8 | uimsbf |
| carrier_frequency | 32 | uimsbf |
| channel_TSID | 16 | uimsbf |
| program_number | 16 | uimsbf |
| ETM_location | 2 | uimsbf |
| access_controlled | 1 | bslbf |
| hidden | 1 | bslbf |
| reserved | 6 | '111111' |
| service_type | 6 | uimsbf |
| source_id | 16 | uimsbf |
| reserved | 6 | '111111' |
| descriptors_length | 10 | uimsbf |
| for (i=0;i<N;i++) { | | |
| descriptors() } | | |
| } | | |
| reserved | 6 | '111111' |
| additional_descriptors_length | 10 | uimsbf |
| for(j=0; j<N;j++) { | | |
| additional_descriptors() } | | |
| CRC_32 | 32 | rpchof |
| } | | |

FIG. 7

| Syntax | Bits | Format |
|---|---|---|
| event_information_table_section () { | | |
| **table_id** | 8 | 0xCB |
| **section_syntax_indicator** | 1 | '1' |
| **private_indicator** | 1 | '1' |
| **reserved** | 2 | '11' |
| **section_length** | 12 | uimsbf |
| **source_id** | 16 | uimsbf |
| **zero** | 2 | '00' |
| **version_number** | 5 | uimsbf |
| **current_next_indicator** | 1 | '1' |
| **section_number** | 8 | uimsbf |
| **last_section_number** | 8 | uimsbf |
| **protocol_version** | 8 | uimsbf |
| **num_events_in_section** | 8 | uimsbf |
| for (j = 0; j< num_events_in_section;j++) { | | |
| **reserved** | 2 | '11' |
| **event_id** | 14 | uimsbf |
| **start_time** | 32 | uimsbf |
| **reserved** | 2 | '11' |
| **ETM_location** | 2 | uimsbf |
| **length_in_seconds** | 20 | uimsbf |
| **title_length** | 8 | uimsbf |
| **title_text()** | var | |
| **reserved** | 4 | '1111' |
| **descriptors_length** | 12 | |
| for (i=0;i<N;i++) { | | |
| **descriptor()** | | |
| } | | |
| } | | |
| **CRC_32** | 32 | rpchof |
| } | | |

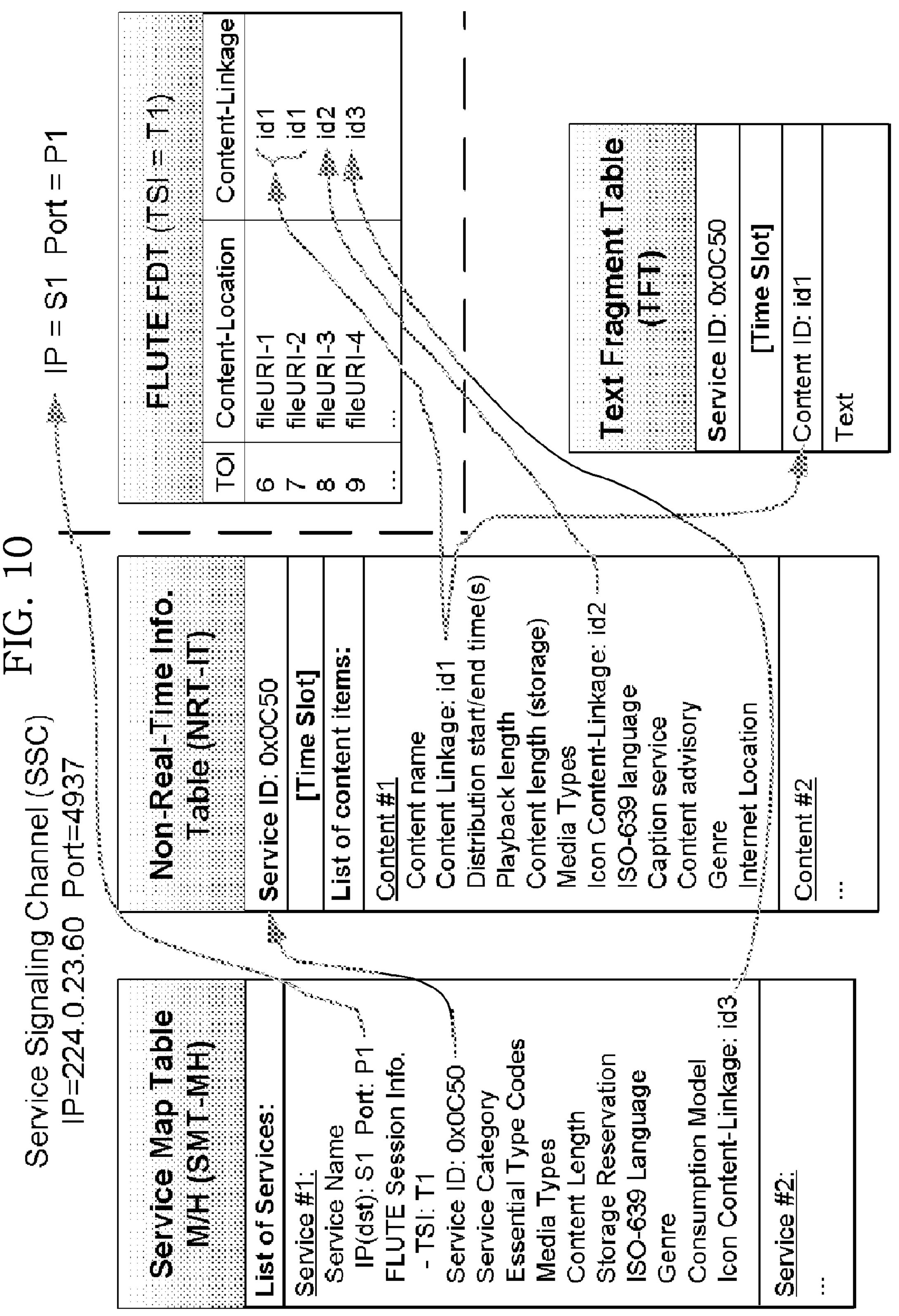

FIG. 10

Service Signaling Channel (SSC)
IP=224.0.23.60 Port=4937

IP = S1 Port = P1

Service Map Table M/H (SMT-MH)

List of Services:

Service #1:
 Service Name
 IP(dst): S1 Port: P1
 FLUTE Session Info.
  - TSI: T1
 Service ID: 0x0C50
 Service Category
 Essential Type Codes
 Media Types
 Content Length
 Storage Reservation
 ISO-639 Language
 Genre
 Consumption Model
 Icon Content-Linkage: id3

Service #2:
 ...

Non-Real-Time Info. Table (NRT-IT)

Service ID: 0x0C50
 [Time Slot]
List of content items:

Content #1
 Content name
 Content Linkage: id1
 Distribution start/end time(s)
 Playback length
 Content length (storage)
 Media Types
 Icon Content-Linkage: id2
 ISO-639 language
 Caption service
 Content advisory
 Genre
 Internet Location Content #2
 ...

FLUTE FDT (TSI = T1)

| TOI | Content-Location | Content-Linkage |
|-----|------------------|-----------------|
| 6   | fileURI-1        | id1             |
| 7   | fileURI-2        | id1             |
| 8   | fileURI-3        | id2             |
| 9   | fileURI-4        | id3             |
| ... |                  |                 |

Text Fragment Table (TFT)

Service ID: 0x0C50
 [Time Slot]
Content ID: id1
Text

FIG. 11a

| Syntax | No. Bits | Format |
|---|---|---|
| Service_map_table_MH_section () { | | |
| table_id | 8 | 0xBD |
| section_syntax_indicator | 1 | '0' |
| private_indicator | 1 | '1' |
| reserved | 2 | '11' |
| section_length | 12 | uimsbf |
| table_id_extension { | | |
| SMT_MH_protocol_version | 8 | uimsbf |
| ensemble_id | 8 | uimsbf |
| } | | |
| reserved | 2 | '11' |
| version_number | 5 | uimsbf |
| current_next_indicator | 1 | bslbf |
| section_number | 8 | uimsbf |
| last_section_number | 8 | uimsbf |
| num_MH_services | 8 | uimsbf |
| for (i=0; i< num_MH_services; i++) | | |
| { | | |
| MH_service_id | 16 | uimsbf |
| multi_ensemble_service | 2 | uimsbf |
| MH_service_status | 2 | uimsbf |
| SP_Indicator | 1 | bslbf |
| short_MH_service_name_length /* m */ | 3 | uimsbf |
| short_MH_service_name | 16*m | |
| reserved | 2 | '11' |
| MH_service_category | 6 | uimsbf |
| num_components | 5 | uimsbf |
| IP_version_flag | 1 | bslbf |
| source_IP_address_flag | 1 | bslbf |
| MH_service_destination_IP_address_flag | 1 | bslbf |
| if (source_IP_addres_flag) | | '11' |
| source_IP_address | 32 or 128 | uimsbf |
| if (MH_service_destination_IP_address_flag) | | |
| MH_service_destination_IP_address | 32 or 128 | uimsbf |

FIG. 11b

| | | |
|---|---|---|
| for (j=0; j<num_components; j++) | | |
| { | | |
| **reserved** | 1 | '1' |
| **essential_component_indicator** | 1 | bslbf |
| **component_destination_IP_address_flag** | 1 | bslbf |
| **port_num_count** | 5 | uimsbf |
| **component_destination_UDP_port_num** | 16 | uimsbf |
| if (component_destination_IP_address_flag) | | |
| **component_destination_IP_address** | 32 or 128 | uimsbf |
| **reserved** | | |
| **num_component_level_descriptors** | 4 | '1111' |
| for (k=0; k<num_component_level_descriptors; k++) | 4 | uimsbf |
| { | | |
| **component_level_descriptor()** | var | |
| } | | |
| } | | |
| **reserved** | 4 | '1111' |
| **num_MH_service_level_descriptors** | 4 | uimsbf |
| for (m=0; m<num_MH_service_level_descriptors; m++) | | |
| { | | |
| MH_service_level_descriptor() | var | |
| } | | |
| } | | |
| **reserved** | 4 | '1111' |
| **num_ensemble_level_descriptors** | 4 | uimsbf |
| for (n=0; n<num_ensemble_level_descriptors; n++) | | |
| { | | |
| **ensemble_level_descriptor()** | var | |
| } | | |
| } | | |

FIG. 12

| Syntax | No. Bits | Format |
|---|---|---|
| NRT_information_table_section(){ | | |
| **table_id** | 8 | 0xTBD |
| **section_syntax_indicator** | 1 | '1' |
| **private_indicator** | 1 | '1' |
| **reserved** | 2 | '11' |
| **section_length** | 12 | uimsbf |
| **service_id** | 16 | uimsbf |
| **reserved** | 2 | '11' |
| NRT_IT_version_number | 5 | uimsbf |
| **current_next_indicator** | 1 | '1' |
| **section_number** | 8 | uimsbf |
| **last_section_number** | 8 | uimsbf |
| **protocol_version** | 8 | uimsbf |
| **time_span_start** | 32 | uimsbf |
| **reserved** | 5 | '11111' |
| **time_span_length** | 11 | uimsbf |
| **num_items_in_section** | 8 | uimsbf |
| for (j=0; j< num_items_in_section; j++) { | | |
| **content_linkage** | 32 | uimsbf |
| **updates_available** | 1 | bslbf |
| TF_available | 1 | bslbf |
| **low_latency** | 1 | bslbf |
| **content_length_included** | 1 | bslbf |
| **playback_length_in_seconds** | 20 | uimsbf |
| if (content_length_included==1) { | | |
| **content_length** } | 40 | uimsbf |
| **playback_delay_included** | 1 | bslbf |
| **expiration_included** | 1 | bslbf |
| **reserved** | 2 | '11' |
| **duration** | 12 | uimsbf |
| if (playback_delay_included==1) { | | |
| **reserved** | 4 | '1111' |
| **playback_delay** } | 20 | uimsbf |
| if (expiration_included==1) { | | |
| **expiration** } | 32 | uimsbf |
| **content_name_length** | 8 | uimsbf |
| **content_name_text()** | var | |
| **reserved** | 4 | '1111' |
| **content_descriptors_length** | 12 | uimsbf |
| for (i=0; i<N; i++) { | | |
| **content_descriptor()** } } | | |
| **reserved** | 6 | '111111' |
| **descriptors_length** | 10 | uimsbf |
| for (i=0; i<M; i++) { | | |
| **descriptor()** } } | | |

FIG. 13

| Syntax | No. Bits | Format |
|---|---|---|
| event_group_table_section(){ | | |
| **table_id** | 8 | 0xe9 |
| **section_syntax_indicator** | 1 | '1' |
| **private_indicator** | 1 | '1' |
| **reserved** | 2 | '11' |
| **section_length** | 12 | uimsbf |
| **event_group_id** | 16 | uimsbf |
| **reserved** | 2 | '11' |
| **version_number** | 5 | uimsbf |
| **current_next_indicator** | 1 | '1' |
| **section_number** | 8 | uimsbf |
| **last_section_number** | 8 | uimsbf |
| **protocol_version** | 8 | uimsbf |
| **group_title_length** | 8 | uimsbf |
| **group_title_text()** | var | |
| **super_group** | 1 | |
| **reserved** | 7 | '1111111' |
| **num_events_in_section** | 8 | uimsbf |
| for (j=0; j< num_events_in_section; j++) { | | |
| **title_length** | 8 | uimsbf |
| **title_text()** | var | |
| **num_links_in_event** | 8 | uimsbf |
| for (j=0; j< num_links_in_event; j++) | | |
| **link type** | 8 | uimsbf |
| **link_media** | 8 | uimsbf |
| **link_length** | 8 | |
| **link_byte** | var | |
| } | | |
| **event_descriptor_length** | 8 | uimsbf |
| **event_descriptor** | var | |
| } | | |
| **group_descriptor_length** | 8 | uimsbf |
| **group_descriptor** | Var | |
| **CRC_32** | 32 | rpchof |
| } | | |

FIG. 14

| Syntax | No. Bits | Format |
|---|---|---|
| event_group_descriptor(){ | | |
| descriptor_tag | 8 | 0xe8 |
| descriptor_length | 8 | uimsbf |
| event_group_id | 6 | uimsbf |
| } | | |

FIG. 15

| table_type | Meaning |
|---|---|
| 0x0000 | Terrestrial VCT with current_next_indicator='1' |
| 0x0001 | Terrestrial VCT with current_next_indicator='0' |
| 0x0002 | Cable VCT with current_next_indicator='1' |
| 0x0003 | Cable VCT with current_next_indicator='0' |
| 0x0004 | Channel ETT |
| 0x0005 | DCCSCT |
| **0x0006** | **Event Group Table** |
| 0x0007-0x00FF | [Reserved for future ATSC use] |
| 0x0100-0x017F | EIT-0 to EIT-127 |
| 0x0180-0x01FF | [Reserved for future ATSC use] |
| 0x0200-0x027F | Event ETT-0 to event ETT-127 |
| 0x0280-0x0300 | [Reserved for future ATSC use] |
| 0x0301-0x03FF | RRT with rating_region 1-255 |
| 0x0400-0x0FFF | [User private] |
| 0x1000-0x13FF | [Reserved for future ATSC use] |
| 0x1400-0x14FF | DCCT with dcc_id 0x00 – 0xFF |
| 0x1500-0xFFFF | [Reserved for future ATSC use] |

FIG. 16

| table_type | Meaning |
|---|---|
| 0x0000 | Terrestrial VCT with current_next_indicator='1' |
| 0x0001 | Terrestrial VCT with current_next_indicator='0' |
| 0x0002 | Cable VCT with current_next_indicator='1' |
| 0x0003 | Cable VCT with current_next_indicator='0' |
| 0x0004 | Channel ETT |
| 0x0005 | DCCSCT |
| 0x0006-0x00FF | [Reserved for future ATSC use] |
| 0x0100-0x017F | EIT-0 to EIT-127 |
| 0x0180-0x01FF | [Reserved for future ATSC use] |
| 0x0200-0x027F | Event ETT-0 to event ETT-127 |
| 0x0280-0x0300 | [Reserved for future ATSC use] |
| 0x0301-0x03FF | RRT with rating_region 1-255 |
| 0x0400-0x0FFF | [User private] |
| **0x1000-0x10FF** | **Event Group Table 0 to Event Group Table 255** |
| 0x1100-0x13FF | [Reserved for future ATSC use] |
| 0x1400-0x14FF | DCCT with dcc_id 0x00 – 0xFF |
| 0x1500-0xFFFF | [Reserved for future ATSC use] |

FIG. 32

Event Group Table group_title_text : Heroes
super_group : 0
num_events_in_section : 3
title_text() : Heroes_episoed 2
title_text() : Heroes_episoed 4
title_text() : Heroes_episoed 5

FIG. 33

| Event Group Table |
|---|
| group_title_text : Heroes |
| super_group : 0 |
| num_events_in_section : 5 |
| title_text() : Heroes_episoed 2 |
| title_text() : Heroes_episoed 3 |
| title_text() : Heroes_episoed 4 |
| title_text() : Heroes_episoed 5 |
| title_text() : Heroes_episoed 6 |

Heroes_episode 5

CP2:VIEWING AVAILABLE(INTERNET SERVICE, 480i)

CP3:SCHEDULING AVAILABLE(REAL TIME SERVICE, 10.20 am2:00~4:00, 720p)

CP4:VIEWING AVAILABLE(INTERNET SERVICE, 720p)

METHOD FOR TRANSCEIVING A BROADCAST SIGNAL AND BROADCAST-RECEIVING USING SAME

This application claims the benefit of priority of PCT Application No. PCT/KR2010/007124 filed on Oct. 18, 2010 and U.S. Provisional Application No. 61/254,742 filed on Oct. 25, 2009, all of which are incorporated by reference in their entirety herein.

TECHNICAL FIELD

The present disclosure relates to a method and device of transceiving a broadcast signal.

BACKGROUND ART

A digital TV may provide various additional services in addition to video and audio as its original function, and for example, may select a program that a user wants through metadata representing program broadcasting airtime.

In the case of Advanced Television System Committee (ATSC) digital broadcasting, program information is delivered using the Program and System Information Protocol (PSIP) standard, and the digital TV interprets the delivered program information and displays an Electronic Program Guide (EPG) on the screen for user's easy selection.

Moreover, the EPG may include information on the basis of hourly program information for each channel and start time and end time information of a corresponding program, which are in an Event Information Table (EIT).

DISCLOSURE OF THE INVENTION

Technical Problem

Embodiments provide a method and device for transceiving a broadcast signal, which may efficiently deliver an association between programs provided through various broadcasting services.

Technical Solution

In one embodiment, a method of transmitting a broadcast signal includes: generating a broadcast stream, first program table information, and second program table information, the broadcast stream including at least one program, the first program table information representing the broadcast stream, the second program table information representing an association between a plurality of programs provided using at least one broadcast service; constituting a stream including the broadcast stream, the first program table information, and the second program table information; and transmitting the constituted stream.

In another embodiment, a method of receiving a broadcast signal includes: extracting a broadcast stream, first program table information, and second program information from the broadcast signal, the broadcast stream including at least one program, the first program table information representing the broadcast stream, the second program table information representing an association between a plurality of programs provided using at least one broadcast service; parsing the broadcast stream by using the extracted first program table information; and obtaining information on a group to which the plurality of programs belong by using the extracted second program table information.

In further another embodiment, a broadcast signal receiving device includes: a receiver for receiving the broadcast signal; a demodulator for demodulating the received broadcast signal; a demultiplexer for extracting a broadcast stream, first program table information, and second program information from the demodulated broadcast signal, the broadcast stream including at least one program, the first program table information representing the broadcast stream, the second program table information representing an association between a plurality of programs provided using at least one broadcast service; a decoder for decoding the extracted first program table information and second program table information; and a controller for obtaining information on a group to which the plurality of programs belong by using the decoded second program table information.

In still further another embodiment, a method of receiving a broadcast signal includes: extracting a broadcast stream, first program table information, and second program information from the broadcast signal, the broadcast stream including at least one program, the first program table information representing the broadcast stream, the second program table information representing an association between a plurality of programs; obtaining information on a group to which the plurality of programs belong from the extracted second program table information; and when one of the plurality of programs is selected, displaying information on an associated program belonging to the same group as the selected program by using the obtained group information, wherein the plurality of programs are received using at least one of RT service, NRT service, and internet service.

Advantageous Effects

According to an embodiment, an association between a plurality of program provided using various services such as RT, NRT, or internet service may be efficiently defined and delivered.

Additionally, a user interface environment for a user to easily confirm and select related program such as series may be provided by using the association between the plurality of programs.

BRIEF DESCRIPTION OF THE DRAWINGS

FIG. 6 is a view illustrating a syntax structure of a Virtual Channel Table (VCT) shown in FIG. 5 according to an embodiment.

FIG. 7 is a view illustrating a syntax structure of an Event Information Table shown in FIG. 5 according to an embodiment.

FIGS. 9 and 10 are views illustrating a configuration of program table information for NRT service according to an embodiment.

FIGS. 11*a* and 11*b* are views illustrating a syntax structure of a Service Map Table (SMT) shown in FIG. 10 according to an embodiment.

FIG. 12 is a view illustrating a syntax structure of a Non-Real-Time Information Table (NRT IT) shown in FIG. 10 according to an embodiment.

FIG. 13 is a view illustrating a syntax structure of an Event Group Table (EGT) according to an embodiment.

FIG. 14 is a view illustrating a syntax structure of an Event Group Descriptor according to an embodiment.

FIG. 15 is a view illustrating table types defined in a Master Guide Table (MGT) according to a first embodiment.

FIG. 16 is a view illustrating table types defined in an MGT according to a second embodiment.

FIGS. 27 to 33 are views illustrating a method of displaying associated program information according to other embodiments.

MODE FOR CARRYING OUT THE INVENTION

Figure 1:
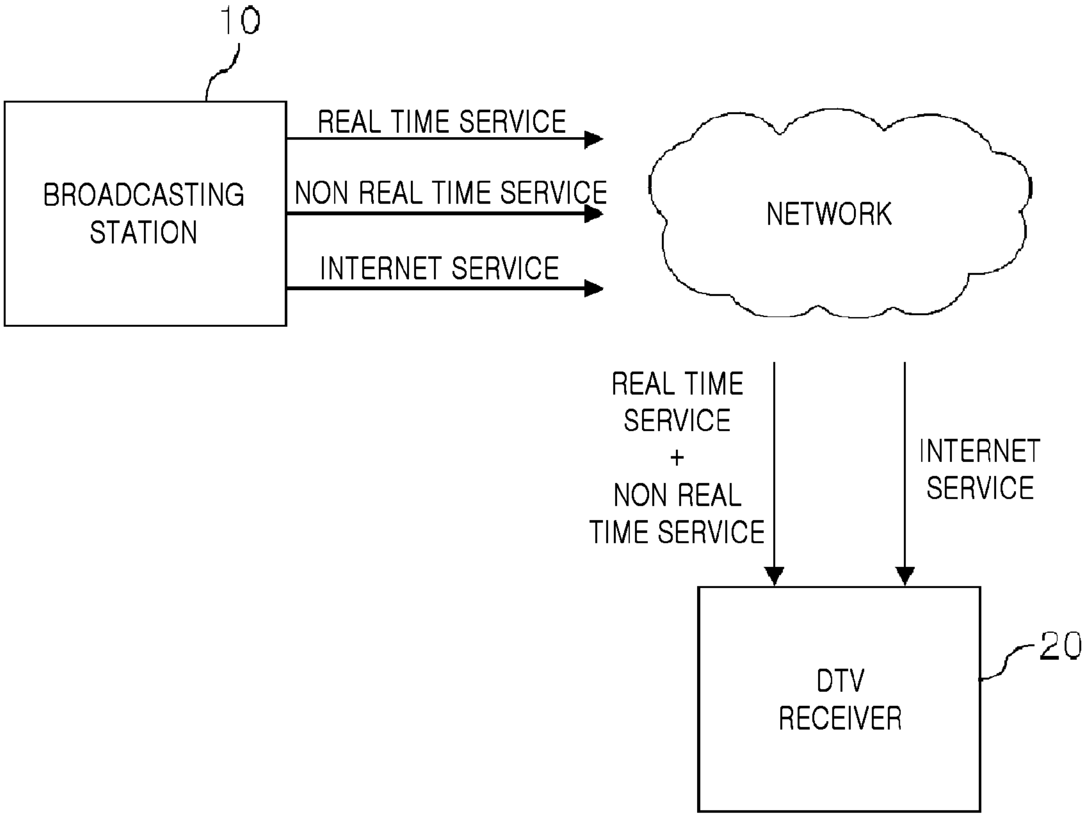
FIG. 1 is a conceptual view illustrating a broadcast service according to an embodiment.

FIG. 1 is a conceptual view illustrating a broadcasting service according to an embodiment.

Referring to FIG. 1, a broadcasting station 10 may provide Real-Time (RT) service and Non-Real-Time (NRT) service to a DTV receiver 20 via a network.

For example, the broadcasting station 10 generates a broadcast signal for Real Time (RT) service according to the Advanced Television Systems Committee (ATSC) adaptive digital broadcasting standard, and then transmit it to the DTV receiver 20 via a network. However, the RT service according to the present invention is not limited to the ATSC standard, and may be transmitted and received through various broadcasting communication standards.

The Non Real Time (NRT) service is a streaming service with which video and audio contents are streamed from the broadcasting station 10 to the DTV receiver 20 at a slower speed or a faster speed (or a combination speed thereof) than an RT speed, and may perform an NRT transmitting, storing, or viewing operation, not an RT streaming operation.

The broadcasting station 10 may transmit the RT service or the NRT service via the same or different channel, and for example, may transmit the RT service, and then, transmit the NRT service using a remaining bandwidth after the RT service transmission or an exclusive bandwidth.

Through the NRT service, the broadcasting station 10 may provide a service including various contents such as news clip, weather information, Video On Demand (VOD), or targeted advertising.

In addition, content data transmitted at a lower or faster speed than RT by using the NRT service may be stored in a high capacity storage device (not shown) equipped in the DTV receiver 20 in order to provide them to a user later.

According to an embodiment, the NRT service may be provided in addition to the RT service according to the ATSC adaptive digital broadcasting standard, but the present invention is not limited thereto.

Additionally, the broadcasting station 10 may provide various internet services such as news clip, weather information, or targeted advertising to the DTV receiver 20 via internet.

Although the broadcasting service according to an embodiment was described with reference to FIG. 1, the present invention is not limited thereto. For example, the above mentioned RT service, NRT service, and internet service may be provided from at least two broadcasting stations, and may be transmitted to the DTV receiver 20 via at least two different networks.

Additionally, the broadcasting station 10 may not provide at least one of the above mentioned RT service, NRT service, and internet service, and may provide another type of additional services besides that.

According to an embodiment, a program information table representing an association between programs provided through the RT service, NRT service, and internet service may be defined for broadcasting transceiving devices, for example, the broadcasting station 10 and the DTV receiver shown in FIG. 1, to transceive and process metadata according to the defined program information table.

Figure 2:
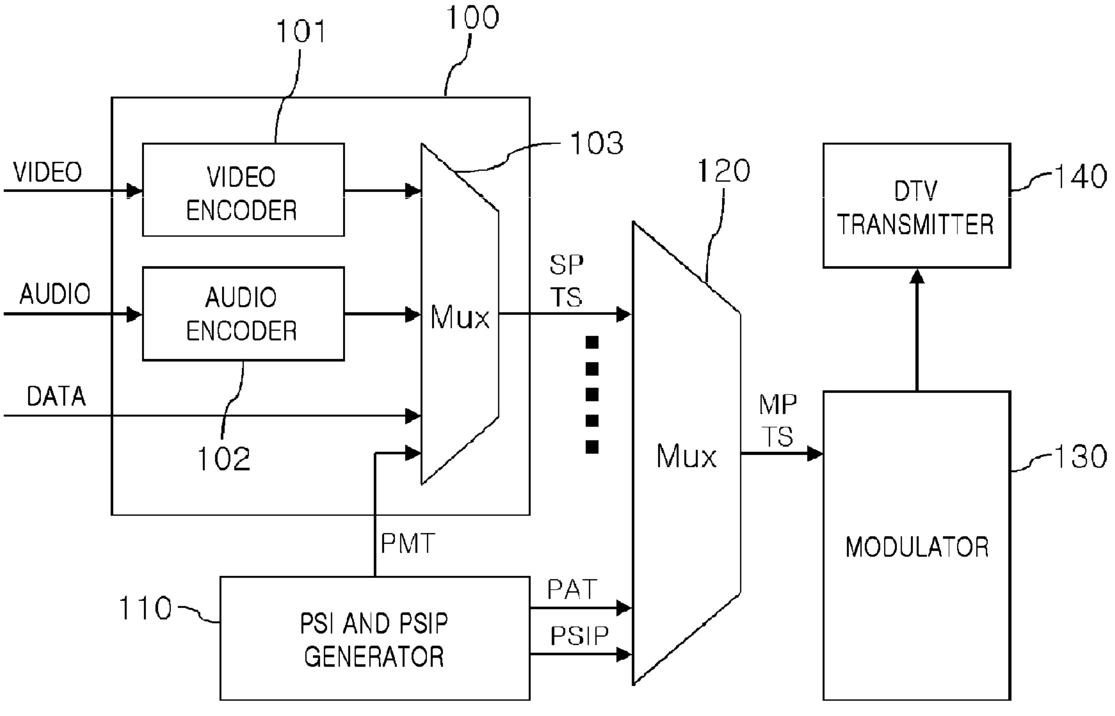
FIG. 2 is a block diagram illustrating a configuration of a broadcast transmitting device.

FIG. 2 is a block diagram illustrating a configuration of a broadcast transmitting device. The broadcast transmitting device may include a program encoder 100, a PSI and PSIP generator 110, a transport multiplexer 120, a modulator 130, and a DTV transmitter 140.

Referring to FIG. 2, the program encoder 100 may include a video encoder 101, an audio encoder 102, and a SP transport multiplexer 103, and may output a single program transport stream (SP TS) corresponding to one program.

The video encoder 101 receives a video signal of a corresponding program and encodes the video signal through a specific compression, for example, an MPEG-2 compression algorithm, and then outputs the encoded video signal to the SP transport multiplexer 103.

Furthermore, the audio encoder 102 encodes an audio signal of the program by using a specific compression, for example, an AC-3 compression algorithm, and then outputs the encoded audio signal to the SP transport multiplexer 103.

The SP transport multiplexer 103 multiplexes video data encoded by the video encoder 101, audio data encoded by the audio encoder 102, information on a corresponding program, and related data to generate a SP TS.

The PSI and PSIP generator 110 may generate program information including Program Specific Information (PSI) and a Program and System Information Protocol (PSIP).

The PSI may include a Program Association Table (PAT), a Program Map Table (PMT), a Network Information Table (NIT), and a Conditional Access Table (CAT). The PSIP may include a System Time Table (STT), a Master Guide Table (MGT), a Virtual Channel Table (VCT), a Rating Region Table (RRT), an Event Information Table (EIT), and an Extended Text Table (ETT).

The PSI and PSIP generator 110 may further generate information on contents provided through the NRT service or information on contents provided through the internet service.

For example, the PSI and PSIP generator 110 may output a PMT among the generated tables to the ST transport multiplexer 103, and may output the PAT and PSIP data to the transport multiplexer 120.

Tables generated by the PSI and PSIP generator 110 may have a configuration according to the ATSC adaptive digital broadcasting standard, and this will be described in detail below.

Moreover, the broadcast transmitting device according to an embodiment may include a plurality of program encoders 100, and a plurality of SP TSs.

The SP transport multiplexer 120 multiplexes the SP TSs inputted from the plurality of program encoders 100 and program information inputted from the PSI and PSIP generator 110, for example, the PAT and PSIP data, to generate a Multi Program (MP) TS.

The modulator 130 modulates the MP TS inputted from the transport multiplexer 120, and outputs it. For example, the modulation method may use an 8-Vestigial Side Band (VSB) according to the ATSC standard. Moreover, the broadcast transmitting device may further include a channel coder.

The DTV transmitter 140 transmits the MP TS outputted from the modulator 130 through a specific frequency band. For example, the DTV transmitter 140 may transmit the MP TS through a 6 MHz RF channel.

The configuration of the broadcast transmitting device according to an embodiment is described with reference to FIG. 2, but the present invention is not limited thereto. Therefore, at least one of components shown in FIG. 2 may be omitted, or an additional component may be further included, if necessary.

For example, moreover, the broadcast transmitting device may further include components for transmitting a broadcast signal through the NRT service or internet service.

Figure 3:
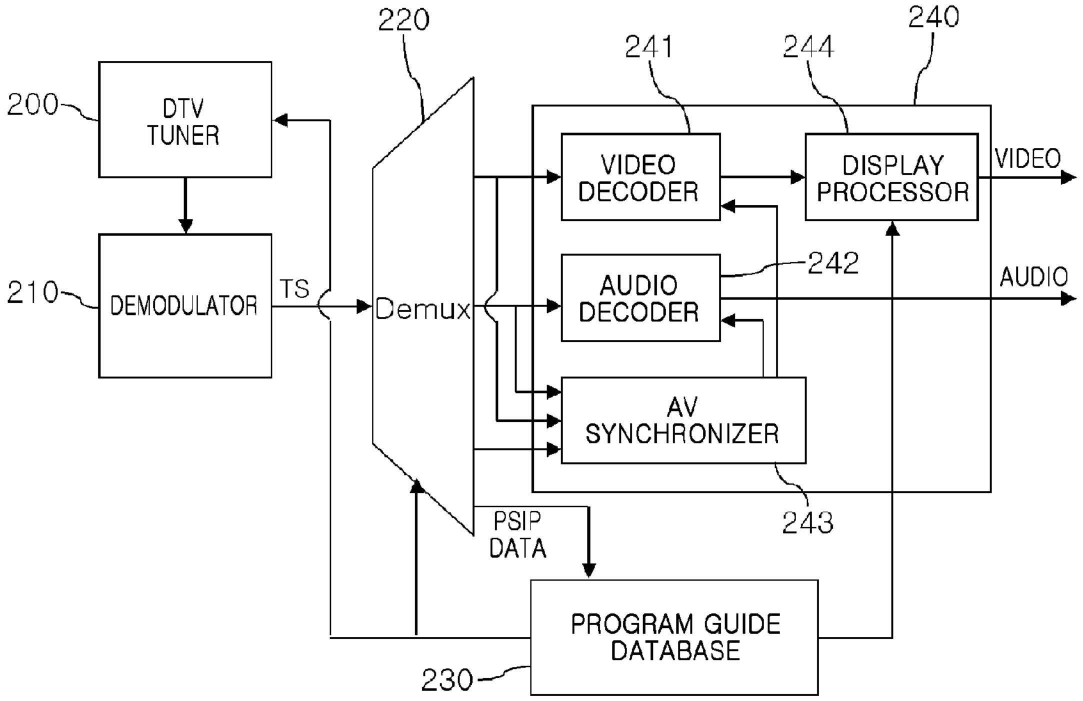
FIG. 3 is a block diagram illustrating a configuration of a broadcast receiving device.

FIG. 3 is a block diagram illustrating a configuration of a broadcast receiving device. The broadcasting receiving device may obtain a video signal and an audio signal from a broadcast signal received from an external by inversely performing the operations of the broadcast transmitting device described with reference to FIG. 2.

Referring to FIG. 3, the DTV tuner 200 may down-convert a broadcast signal received via a frequency of a specific physical transport channel through an antenna or cable into an Intermediate Frequency (IF) corresponding to a channel that a user selects, and then, may output the down-converted broadcast signal to a demodulator 210.

The demodulator 210 may demodulate a signal outputted from a tuner through a specific modulation, for example, the 8-VSB modulation, and then may output a TS of an actual bit string.

A demultiplexer 220 may demultiplex the TS inputted from the demodulator 210 to extract video stream and audio stream, and for example, may demultiplex the TS into an MEPG-2 bit stream and AC-3 bit stream.

The demultiplexer 220 may separate program information such as the PSI and PSIP from the TS in order to extract it.

Furthermore, the demultiplexer 220 may output the extracted program information, for example, PSIP data, to the program guide database 230.

Moreover, the TS may further include information on contents received through the NRT service or internet service, and accordingly, the demultiplexer 220 may extract the content information from the TS.

A program decoder 240 may decode the video stream and audio stream inputted from the demultiplexer 220 to output video and audio signals in a playback available format, and for this, may further include a video decoder 241, an audio decoder 242, and an AV synchronizer 243, and a display processor 244.

The video decoder 241 decodes a video stream inputted from the demultiplexer 220 through a specific compression, for example, an MPEG-2 compression algorithm, and then outputs the decoded video stream to the display processor 244. Then, the display processor 244 may convert the inputted video signal into displayable various formats for output.

Moreover, the audio decoder 242 may decode the inputted audio stream through a specific compression, for example, an AC-3 compression algorithm, and then, may output the decoded audio stream.

The AV synchronizer may synchronize the video signal with the audio signal, which are decoded by the video decoder 241 and the audio decoder 242, respectively, by using PCR's from the demultiplexer 220 and time stamps from the video stream.

The configuration of the broadcast receiving device according to an embodiment is described with reference to FIG. 3, but the present invention is not limited thereto. Therefore, at least one of components shown in FIG. 3 may be omitted, or an additional component may be further included, if necessary.

For example, moreover, the broadcast receiving device may further include components for receiving a broadcast signal through the NRT service or internet service and processing the received broadcast signal.

In more detail, the broadcast receiving device may further include a network interface unit (not shown) for receiving contents through internet service, a display unit (not shown) for playing a video signal outputted from the program decoder 240, or an audio outputting unit (not shown) for outputting the audio signal.

Hereinafter, a method of transmitting a broadcast signal according to an embodiment will be described in detail with reference to FIGS. 4 to 16.

Figure 4:
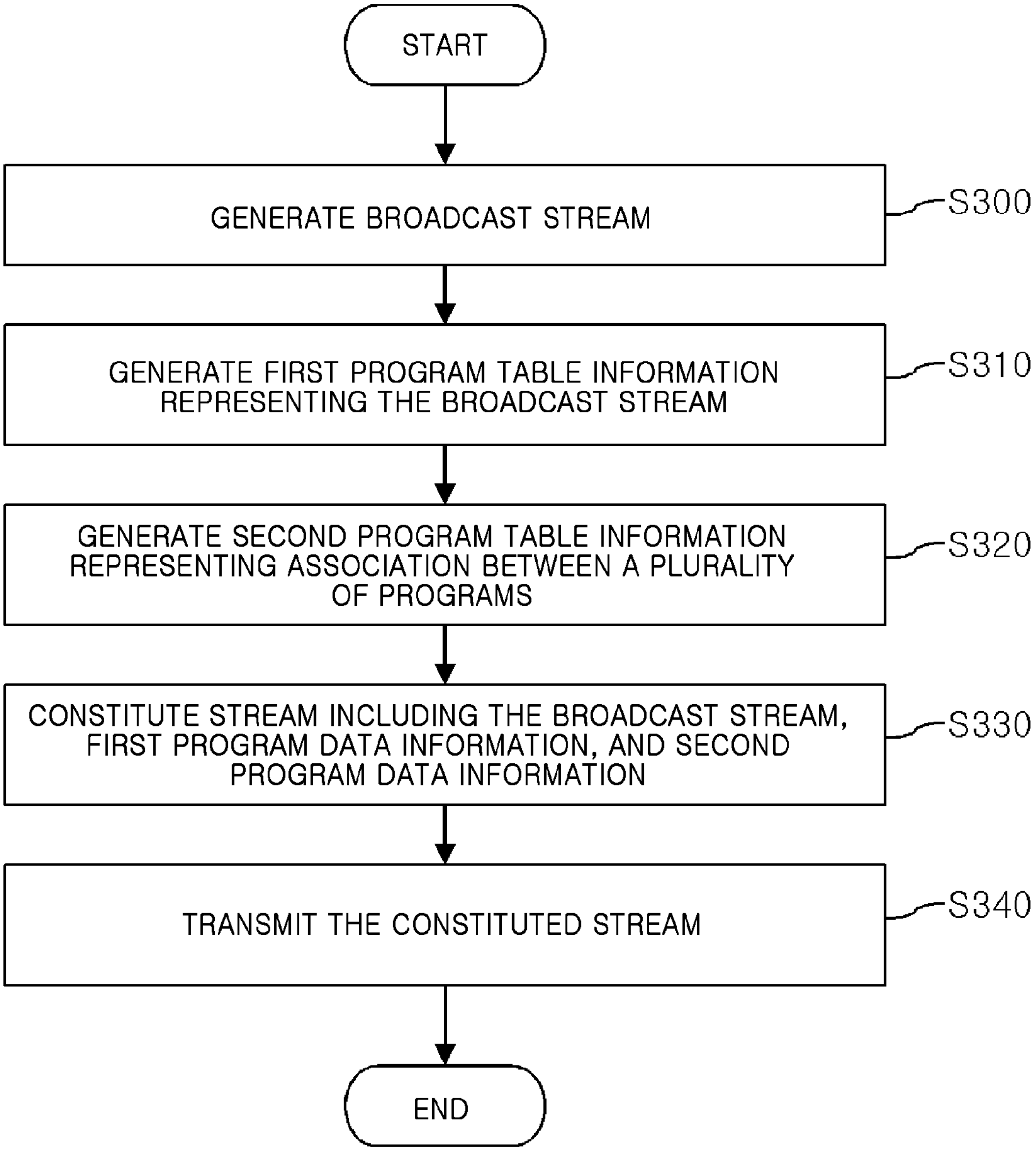
FIG. 4 is a flowchart illustrating a method of transmitting a broadcast signal according to an embodiment.

FIG. 4 is a flowchart illustrating a method of transmitting a broadcast signal according to an embodiment, and overlapping contents described with reference to FIGS. 1 to 3 will be omitted.

Referring to FIG. 4, a broadcast transmitting device generates a broadcast stream in operation S300, and generates first program information representing the broadcast stream in operation S311.

For example, the program encoder 100 in FIG. 2, in more detail, the video encoder 101 and the audio encoder 102, may generate and output a broadcast stream including video data and audio data.

The first program information may include tables according to PSI or PSIP generated by the PSI and PSIP generator 110, and an embodiment relating to the first program information on RT content, i.e., a program provided through RT service, will be described in detail with reference to FIGS. 5 to 7.

Additionally, the first program information may include information on NRT content, i.e., a program provided through NRT service, and its embodiment will be described in detail with reference to FIGS. 9 to 12.

Additionally, the first program information may further include information on internet content, i.e., a program provided through internet service.

Then, the broadcast transmitting device generates second program table information representing an association between a plurality of programs.

Additionally, the plurality of programs may be services provided through at least one of the above mentioned RT service, NRT service, and internet service.

For example, all programs having an association in the second program table information may be provided through at least one of the above mentioned RT service, NRT service, and internet service, or may be provided through at least two different services among the services.

Furthermore, the plurality of programs may have an association according to various program attributes such as a corresponding program content, name, format, provider, manufacturer, editor, creation date, length, or size, and may be grouped according to the association between the programs.

In this case, the second program table information may include information on at least one group to which the plurality of programs belong, for example, identification information on a corresponding group and programs belong thereto.

Additionally, the second program table information may be generated in the PSI and PSIP generator 110 of the broadcast transmitting device of FIG. 2.

An embodiment relating to the second program table information that represents an association between the programs will be described in detail with reference to FIGS. 13 to 17.

The broadcast transmitting device generates a stream including the generated broadcast stream, first program table information, and second program table information in operation S330, and then transmits the generated stream in operation S340.

For example, the transport multiplexer 120 of the broadcast transmitting device of FIG. 2 may multiplex the generated broadcast stream, first program table information, and second program table information in order to generate a TS. Then, the generated TS may be transmitted through the DTV transmitter 140 after passing through the modulator 130.

Figure 5:
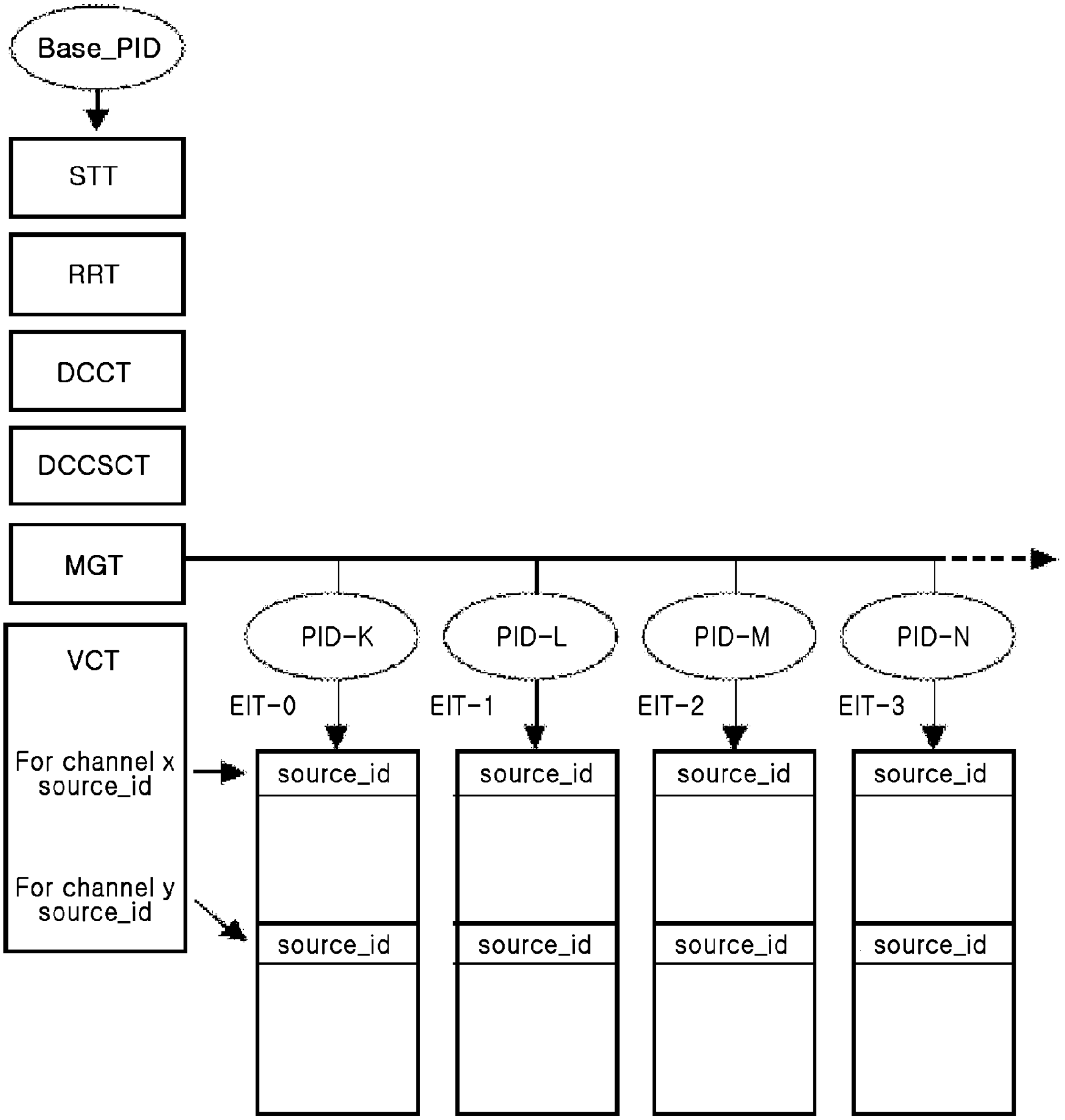
FIG. 5 is a view illustrating a configuration of program table information for RT service according to an embodiment.

FIGS. 5 to 7 are views illustrating tables including information on RT content, which is used for describing an embodiment relating to a configuration of the first program information.

Table 1 represents tables defined using the PSIP according to the ATSC digital broadcast standard.

TABLE 1

| Table | Role |
|---|---|
| MGT | Provide version number, size, and PID with respect to other tables |
| VCT | Provide attributes of virtual channels |
| EIT | Provide information on events of virtual channels |
| ETT | Provide detailed information on virtual channels and events |
| RRT | Provide rating information on a plurality of areas |
| STT | Provide date and time |

Referring to Table 1 and FIG. 5, the STT may provide information on current date and time and thus, may include time information necessary for application that requires synchronization.

Additionally, the RRT may provide rating information, and may define effective rating tables with respect to different regions or nations.

The MGT is a pointer for other PSIP tables, and may define a size, PID, and version number for each table.

For example, whether tables are modified may be confirmed by using the version number and PID of each table in the MGT whose Base-PID is 0xFFB, and accordingly, the modified table may be received.

Furthermore, the VCT may represent virtual channel information necessary for channel navigation and tuning, and may include two versions such as a Terrestrial Virtual Channel Table (TVCT) for terrestrial broadcasting and a Cable Virtual Channel Table (CVCT) for cable broadcasting.

For example, the VCT may include as basic information a TS ID, a channel number, a short channel name, a program number, an access controller flag, a location field for Extended Text Message (ETM), and a service type, and may consist of syntax as shown in FIG. 6.

Figure 9:
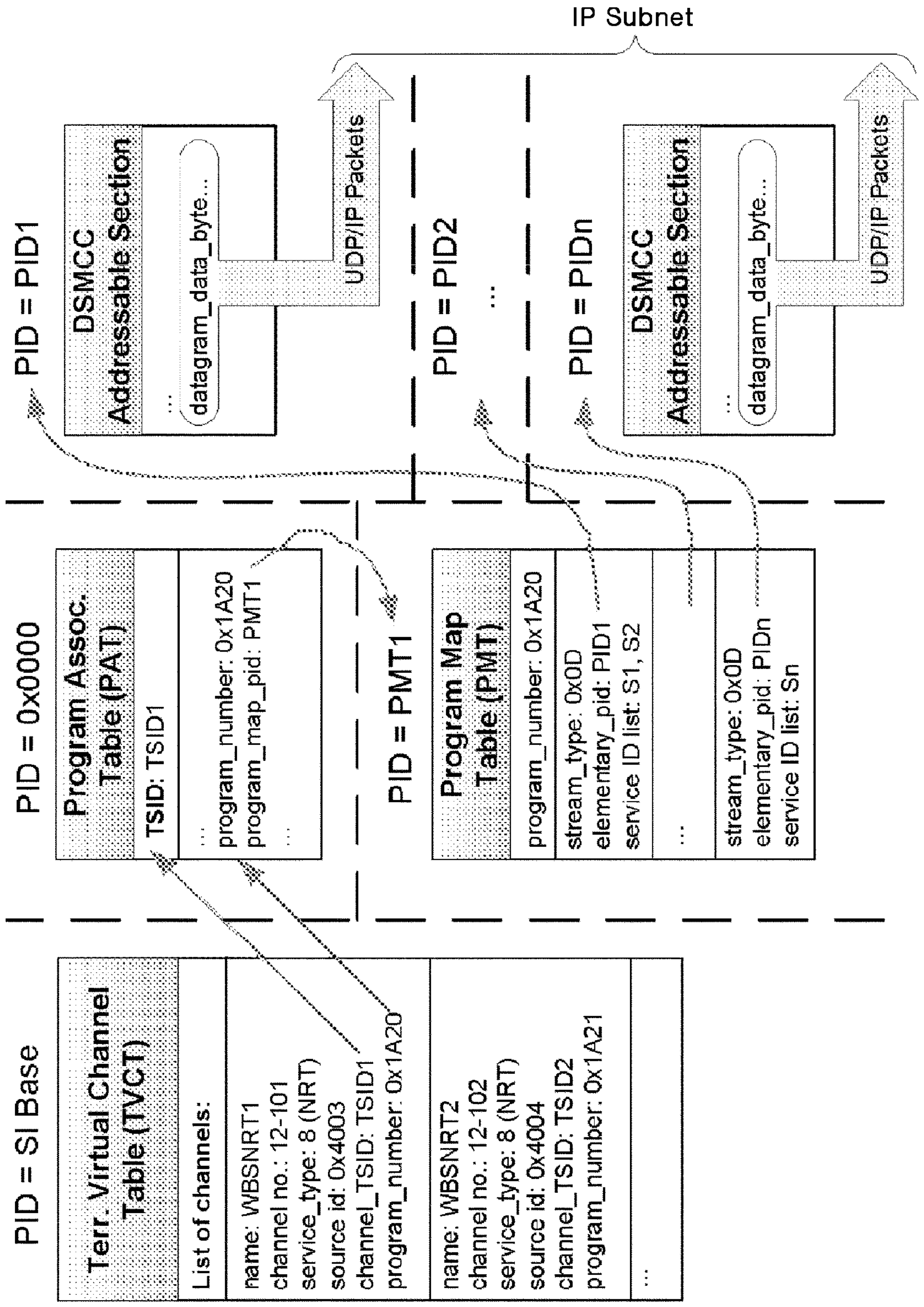

In more detail, a broadcast channel defined in the ATSC standard may include a plurality of virtual channels in the VCT consisting of syntax as shown in FIG. 9. Accordingly, the broadcast receiving device may recognize a virtual channel in a corresponding broadcast channel when receiving the VCT. Additionally, the virtual channels are respectively separated channels, and may have different source_id for channel identification.

The EIT includes information on events (i.e., programs) for the virtual channels in the VCT, and may consist of syntax as shown in FIG. 7.

Additionally, the EIT may classify the events according to each channel by using source_id in the VCT.

Additionally, the EIT may consist of 128 tables, i.e., from EIT-0 to EIT 127 corresponding to current events, each having information on programs in a corresponding time interval of every three hours.

The ETT may include relatively long text messages for the events and virtual channels. For example, each of the VCT and EIT may include one ETT, or may not include the ETT at all.

The Directed Channel Change Table (DCCT) provides definitions for modification requests of virtual channels, and the Directed Channel Change Selection Code Table (DCCSCT) provides extension for a basic genre category and location code. The two tables DCCT and DCCSCT may be selective.

Figure 8:
FIG. 8 is a view illustrating a data allocation method of a broadcast channel according to an embodiment.

FIG. 8 is a view illustrating a data allocation method of a broadcast channel according to an embodiment.

Referring to FIG. 8, a broadcast channel according to the ATSC standard is modulated through a VSB method of a 6 Mhz band, and a bandwidth of data carried on the modulating wave may be about 19.3 Mps. Moreover, the broadcast channel stream may occupy a bandwidth of about 12 Mbps to about 13 Mbps, and accordingly, 6 Mps to 7 Mps in the 19.3 Mps may be transmitted as a null packet coded with 0.

The null packet, not a payload, may be used for accurately delivering a system timer value to a section data area.

Furthermore, the null packet area of 6 Mps to 7 Mps may be used for transmitting another data in addition to a broadcast channel stream.

According to an embodiment, NRT content data provided through the NRT service may be transmitted using the remaining bandwidth of 6 Mps to 7 Mps, and for this, a Digital Storage Media-Command & Control (DSM-CC) protocol and a File Delivery over Unidirectional Transport (FLUTE) method may be used.

FIGS. 9 to 12 are views illustrating tables including the information on NRT content, which is used for describing another embodiment relating to a configuration of the first program information.

Referring to FIG. 9, a terrestrial VCT (TVCT) may provide information on virtual channels, and may include service_type representing the NRT service. For example, the NRT service delivered through an IP packet may be represented with service_type having a value of 0x08.

Moreover, the TVCT may include program_number and channel_TSID indicating information in a PAT, and the PAT may indicate a PMT through program_map_pid.

Furthermore, a TS packet corresponding to a PID elementrary_pid in the PMT may include a DSMCC Addressable Section, and may deliver an IP packet for the NRT service by using the DSMCC Addressable Section.

For example, IP packets for NRT services in one virtual channel may be delivered as TS packets that respectively correspond to a plurality of PID values, and IP packets delivered through all DSM-CC addressable sections referred from the PMT may be gathered to constitute one IP subnet.

Referring to FIG. 10, for the NRT service, the first program table information may include a Non-Real-Time Information Table (NRT IT), a Service Map Table (SMT), and a FLUTE File Delivery Table.

Moreover, the NRT IT may further include information on NRT contents received through the NRT service and the SMT-MH may be linked to the NRT IT by using a Service ID.

The SMT-MH may be linked to a FLUTE File Delivery Table (FDT) by using IP dst (i.e., a destination IP address), port (i.e., a port number), and a Transport Session Indicator (TSI).

According to an embodiment, IP dst and port in the SMT-MH may be 224.0.23.60:4937, i.e., a Service Signaling Channel (SSC) according to the ATSC standard.

The SMT-MH may include service-level attributes for NRT services in a TS, and for this, may consist of syntax as shown in FIGS. 11a and 11b.

For example, for the NRT service, service category of the SMT-MH may be set with 0x0E.

A content linkage in the NRT IT may correspond to at least one file of the FLUTE FDT, and the FLUTE FDT may include Content-Location for each file, for example, a Uniform Resource Locator (URL).

Moreover, an icon content-linkage in the SMT-MH or NRT-IT may correspond to a file including a graphic icon in the FDT.

Additionally, it may be linked to a Text Fragment Table (TFT) by using a content linkage in the NRT-IT, and the TFT may provide text metadata for corresponding content.

FIG. 12 is a view illustrating syntax of the NRT IT.

Referring to FIG. 12, the NRT-IT may include information on RT content such as a content_name, a content_linkage, duration/expiration, playback_length, or content_length.

The configuration of the first program table information for NRT service described with reference to FIGS. 9 to 12 is just one embodiment, and thus, the present invention is not limited thereto.

For example, the information on NRT service may be delivered through the following method.

Once 0x95 representing the NRT service is delivered as a stream_type to a Service Location Descriptor (SLD) in the TVCT, the broadcast receiving device recognizes that a corresponding virtual channel corresponds to the NRT service.

Additionally, Once 0x95 representing the NRT service is delivered as stream_type to a Service Location Descriptor (SLD) in the TVCT, the broadcast receiving device recognizes that a corresponding virtual channel corresponds to the NRT service.

The DST delivers additional information for providing data service, and an association tag for the NRT service may be searched by using the additional information.

The association tag is connected to one of streams of the PMT, and a stream corresponding to the PID that the one indicates may include the information on NRT service.

Furthermore, a TS packet corresponding to the PID that the association tag of the PMT indicates may include a DSMCC Addressable Section, as described with reference to FIG. 9.

Hereinafter, a configuration of second program table information representing an association between programs according to an embodiment will be described in detail with reference to FIGS. 13 to 17.

According to an embodiment, programs having an association may be divided into one event group, and the second program table information may include an Event Group Table (EGT) for representing information on the event group.

Additionally, a plurality of programs in one event group defined in the EGT may include programs in the EIT and programs provided through the NRT service or internet service.

For this, the EGT may include a name of a corresponding group, the number of programs in the group, a name for each program, and link information.

FIG. 13 is a view illustrating syntax of the EGT according to an embodiment.

Referring to FIG. 13, table_id of the EGT is an original ID assigned to the EGT, and section_syntax_indicator may have a value of 1 to represent that the table is section syntax.

private_indicator may have a value of 1 to represent that the EGT is an MPEG2 private section, and section_length may represent the length of a corresponding section.

event_group_id represents an ID of an event group corresponding to the EGT, and may be used to represent an event group which each program belongs to or include a corresponding event group in a super group.

Moreover, version_number is a value of modulo 32, which is increased by 1 each time the content of the EGT is updated, and current_next_indicator may have a value of 1 to represent that corresponding table is currently effective.

If the corresponding EGT is a multi section, section_number represents a serial number of a corresponding section, and last_section_number represents a serial number of the last section.

Moreover, protocol_version may have a value of 0 as a version number of the EGT standard.

group_title_length of the EGT represents the title length of a corresponding event group, and event_group_id represents an ID of an event group corresponding to the EGT, and group_title_text( ) is a multiple string representing the name of a corresponding event group.

Additionally, super_group represents whether the event group is a super group including another event group. If super_group has a value of 1, a corresponding event group is a super group including another event group, and if super_group has a value of 0, a corresponding event group includes programs such as RT content, NRT content, or internet content.

num_events_in_section represents the number of programs in the event group. title_length represents the length of a program title, and may represent the title of the event group if a corresponding group is a super group.

Moreover, title_text( ) represents the title of a program, and num_links_in_event represents the number of accessible links for receiving a corresponding program.

There may be the specific number of links for each program in the event group, and if there are a plurality of links for one program, the priorities of the links may be determined on the basis of accessibility and availability.

link_type may represents what a corresponding link means, and types of information obtainable from the link may be divided as the following Table 2.

TABLE 2

| | link_type |
|---|---|
| Sub group | 0x00 |
| Html portal | 0x01 |
| Thumbnail | 0x02 |
| Preview clip | 0x03 |

Referring to Table 2, information obtainable from a link may have four types including a subgroup in a super group, Html Portal, thumbnail, and preview clip. Values of 0x00, 0x01, 0x02 and 0x03 may be assigned to the link types, respectively.

link_media represents an access path for receiving a program; link_length represents the length of a link for accessing the media; and link_byte represents the ID of a corresponding link.

Since the ID of a link for accessing each media that provides a program may be different, link_length and link_byte may be designated to identify this.

Table 3 represents link_media and link_byte designated for each service that provides a program.

TABLE 3

| | link_media | link_byte |
|---|---|---|
| Sub group | 0x04 | event_group_id |
| RT service | 0x01 | ETM_id |
| NRT service | 0x02 | service_id, content_id |
| Internet service | 0x03 | URL |

Referring to Table 3, additional link_media having an additional value of 0x04 is designated for a sub group in a super group, and event_group_id of the sub group may be designated for link_byte.

Additionally, link_media having 0x01, 0x02 and 0x03 may be respectively designated for RT service, NRT service, and internet service that provide programs in an event group.

ETM_id may be designated with link_byte for a program provided through RT service, i.e., events in EIT, and the ETM_id may include information on event_id and source_id that corresponds to a corresponding program.

link_byte may be designated for NRT content. i.e., a program provided through NRT service, with the ID of the NRT service, i.e., service_id and the ID of NRT content, i.e., content_id.

Additionally, a URL for downloading the internet content may be designated for link_byte, with respect to internet content, i.e., a program provided through internet service.

Moreover, content_id may correspond to content_linkage or content_name_text( ) of the NRT IT described with reference to FIG. 12.

By using link_byte, the EGT may be linked to tables having information on programs in a corresponding event group, for example, the EIT or the NRT IT.

Additionally, if a corresponding program is internet content, the broadcast receiving device may download the corresponding program through an access to a server that stores the internet content by using a URL, i.e., link_byte corresponding to the internet content.

Although the configuration of the EGT according to an embodiment was described with reference to FIG. 13, the present invention is not limited thereto.

For example, in relation to a plurality of programs in an event group, an original ID for each corresponding content is defined, and accordingly, link information may be constituted by using only the content original ID without distinguishing link media.

Moreover, event_descriptor describes additional information relating to a corresponding event, and event_descriptor_length represents the length of event_descriptor.

As an example of additional information in event_descriptor may include a genre descriptor representing a genre of a corresponding event, a caption service descriptor representing whether there is a caption, or a content advisory descriptor representing a parental rating.

group_descriptor describes additional information relating to a corresponding event group, and group_descriptor_length represents the length of the group_descriptor.

group_descriptor may include a genre descriptor representing a genre of the event group, a caption service descriptor representing whether there is a caption, or a content advisory descriptor representing a parental rating.

Moreover, additional information in group_descriptor may be applied to all events in a corresponding event group. However, in the case of a specific event, if the content of group_descriptor is different from that of event_descriptor, additional information described in event_descriptor may be prioritized.

For example, if all programs in an event group have the same genre, by using only the genre descriptor in group_descriptor, genre information on the programs may be delivered, and accordingly, an amount of information transmitted may be reduced because the genre information does not need to be additionally described in the EIT.

According to an embodiment, the information on an event group may be in a table having information on programs that belong to the event group.

The information on an event group may be described with an Event Group Descriptor (EGD) as shown in FIG. 14.

Referring to FIG. 14, the EGD may include descriptor_tag and descriptor_length in addition to event_group_id.

Additionally, the EGD may be in an event descriptor of the EIT and a content descriptor of the NRT IT.

For example, if an RT content Event1 and an NRT content CONTENT1 are in an event group having an ID of EG1, the EGD having EG1 as a value of event_group_id may be in a descriptor of the EIT having information on the EVENT1 and content_descriptor of the NRT IT having information on the CONTENT1.

Accordingly, it may be represented that EVENT1, i.e., an event in the EIT, and CONTENT1, i.e., an NRT content, in the NRT IT, are in the event group having the ID of EG1.

According to an embodiment, a table type for the EGT may be added to a Master Guide Table (MGT).

FIG. 15 is a view illustrating table types defined in the MGT according to an embodiment.

Referring to FIG. 15, the MGT may define table_type for other tables such as a VCT, an ETT, an EIT, a DCCSCT, an RRT, and a DCCT, and in addition to that, may define table_type for the EGT.

Moreover, the MGT may provide a PID, a version number, and a size for each of a plurality of tables including an EGT.

As shown in FIG. 15, if table_type for the EGT, for example, 0x0006, is defined in the MGT, a plurality of EGTs corresponding to the plurality of event groups may have the same PID.

In this case, the plurality of EGTs having the same PID may be distinguished from each other by group_id stored in table_id_extension of the MGT.

By allocating only one table_type to the EGT, there is a spare in an area for defining table_type and there is no limitation in the number of EGTs.

FIG. 16 is a view illustrating table types defined in the MGT according to another embodiment.

Referring to FIG. 16, the MGT may define a plurality of table_type for the EGT, and accordingly, the plurality of EGTs may have different table_type and different PIDs.

For example, 256 event group tables EGT0 to EGT255 corresponding to table_type of 0x1000-0x10FF and having different PIDs may be defined in the MGT.

In this case, in comparison to FIG. 15, without confirming the EGD in the EIT, by confirming only table_type of the EGT defined in the MGT, information on a plurality of EGTs such as the number of the EGTs, i.e., the number of event groups, .may be easily confirmed.

Hereinafter, data linkage between an EGT, an EIT, and an NRT IT will be described with reference to FIG. 17 according to an embodiment.

By using a first virtual channel in a VCT, i.e., source id of "VCH0", EIT0 and EIT1 having source id of "VCH0" may be connected.

Additionally, by using program information in EIT0 and EIT1, it is recognized that there are four programs "EVENT0", "EVENT1", "EVENT2", and "EVENT3" provided to the virtual channel "VCH0" through RT service.

Since there is an EGD for "EVENT0" in the EIT0 and "EG0" is listed as event_group_id in the EGD, it is recognized that the "EVENT0" is in an event group having the ID of "EG0".

Moreover, Since there is an EGD for "EVENT2" in the EIT1 and "EG0" is listed as event_group_id in the EGD, it is recognized that the "EVENT2" is in an event group having the ID of "EG0"

Figure 17:
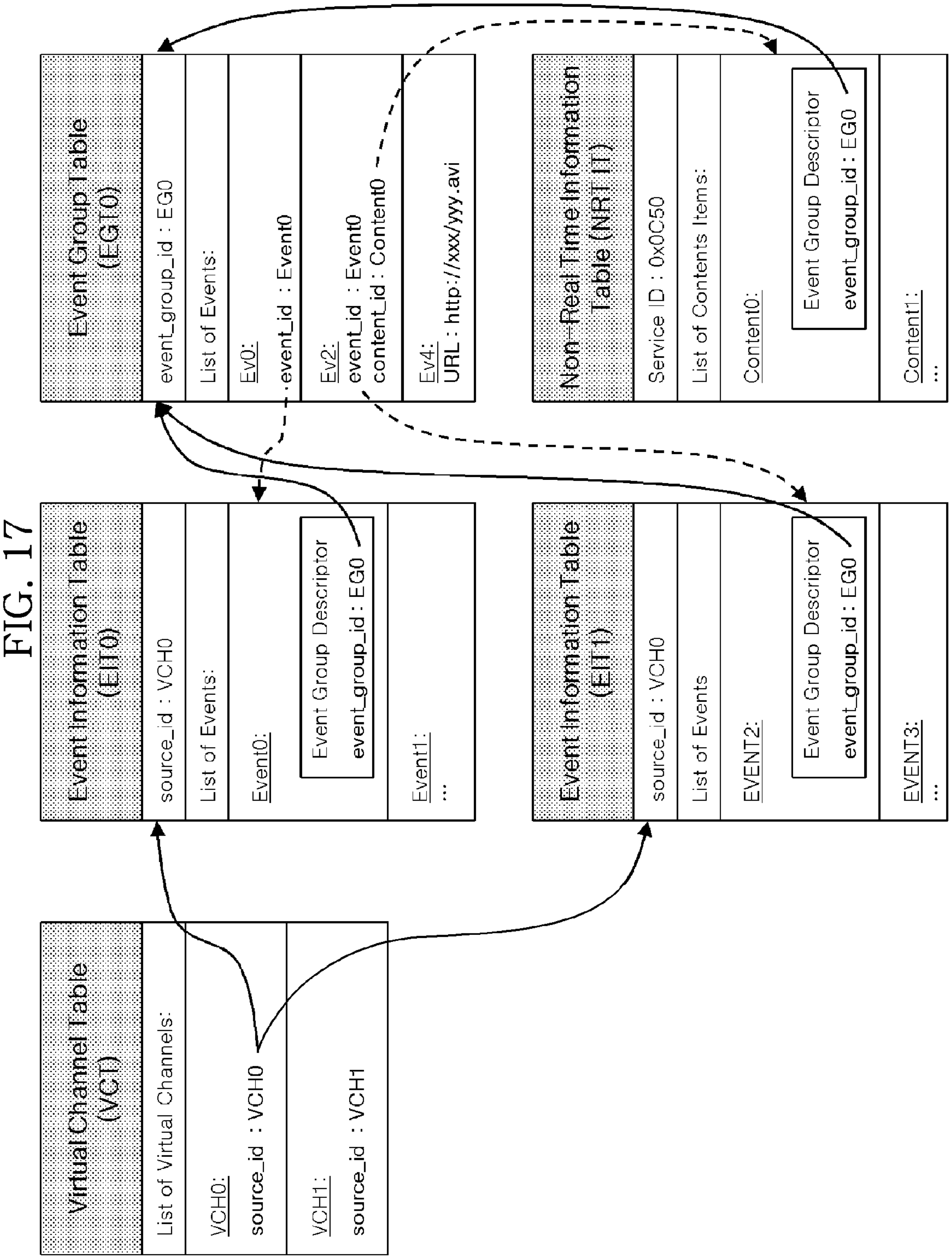
FIG. 17 is a view illustrating a data linkage between an EGT, an EIT, and an NRT IT according to an embodiment.

By using the NRT IT as shown in FIG. 17, it is recognized that two NRT contents "Content0" and "Content1" are provided through NRT service having the service ID of "0x0C50".

Moreover, Since there is an EGD for "Content0" in the NRT IT and "EG0" is listed as event_group_id in the EGD, it is recognized that "Content2", i.e., the NRT content, is in an event group having the ID of "EG0".

Additionally, the information on "EVENT0", "EVENT2", and "Content0" in the event group "EG0" may be in an event group table EGT0 corresponding to the event group "EG0".

Referring to FIG. 17, information on three programs "Ev0", "Ev2", and "Ev4" may be in the event group table EGT0 having event_group_id of "EG0"

Additionally, Ev0 in the event group "EG0" has event_id of "EVENT0", and the event group table EGT0 may be linked to the EIT0 by using event_id.

Moreover, the "EV2" has event_id of "EVENT2" and content_id of "Content0", and the EGT0 may be linked to the EIT1 by using event_id, and may be linked to the NRT IT by using content_id.

Additionally, the EGT0 includes a URL of http://xxx/yyy.avi with respect to the "Ev4", and accordingly, the Ev4 may be accessed using the URL.

By Data linkage between tables as shown in FIG. 17, programs "Ev0", "Ev2", and "Ev4" having an association are in the event group "EG0". The Ev0 is provided as "EVENT0" of a virtual channel "VCH0" through RT service. The "Ev2" is provided as "EVENT2" of a virtual channel "VCH0", or provided as "Content0", i.e., NRT content, through NRT service having service_id of "0x0C50". The Ev4 may be provided using internet service having a URL of http://xxx/yyy.avi.

Hereinafter, a method and device of receiving a broadcast signal according to an embodiment will be described in detail with reference to FIGS. 18 to 22.

The method of receiving a broadcast signal may be performed through inverse operations of the method of transmitting a broadcast signal described with reference to FIGS. 3 to 17, and thus, overlapping contents will be omitted.

Figure 18:
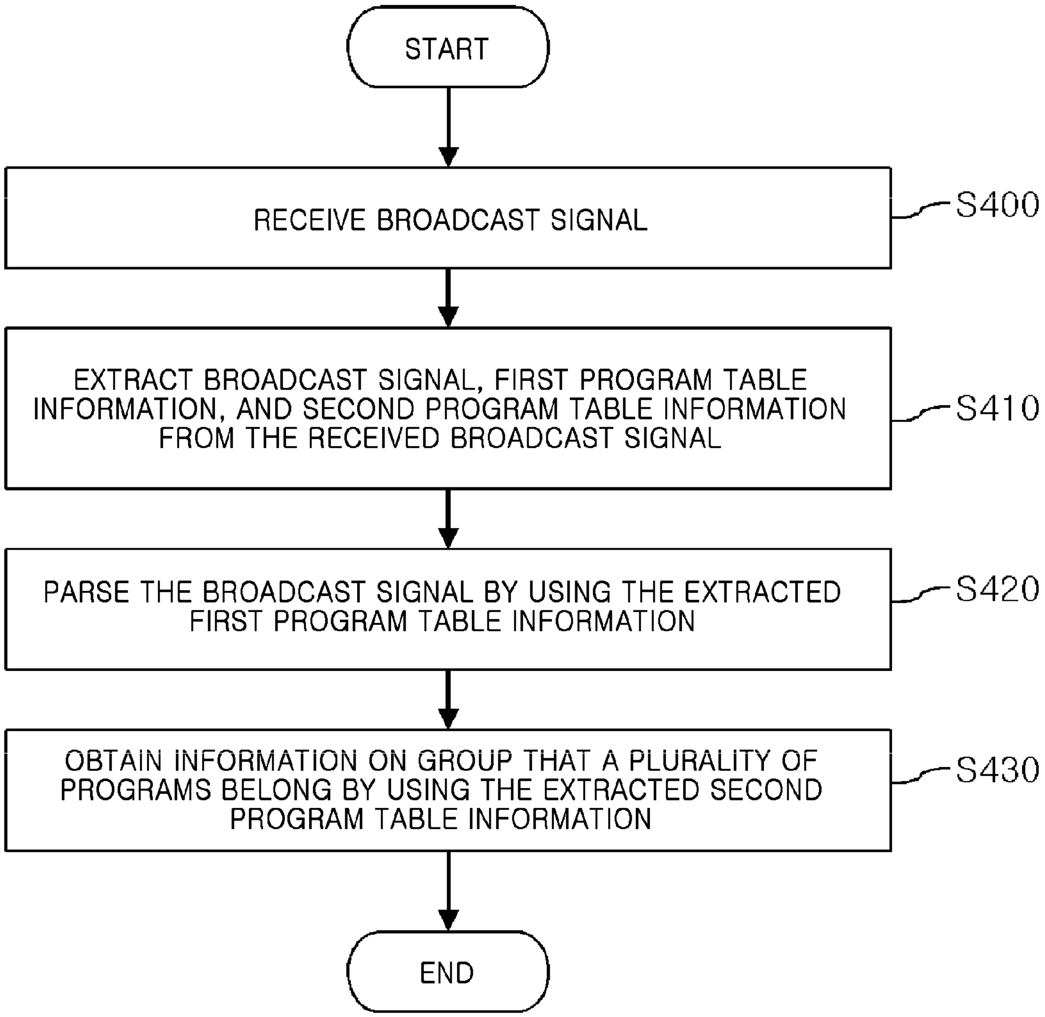
FIG. 18 is a flowchart illustrating a method of receiving a broadcast signal according to a first embodiment.
Figure 19:
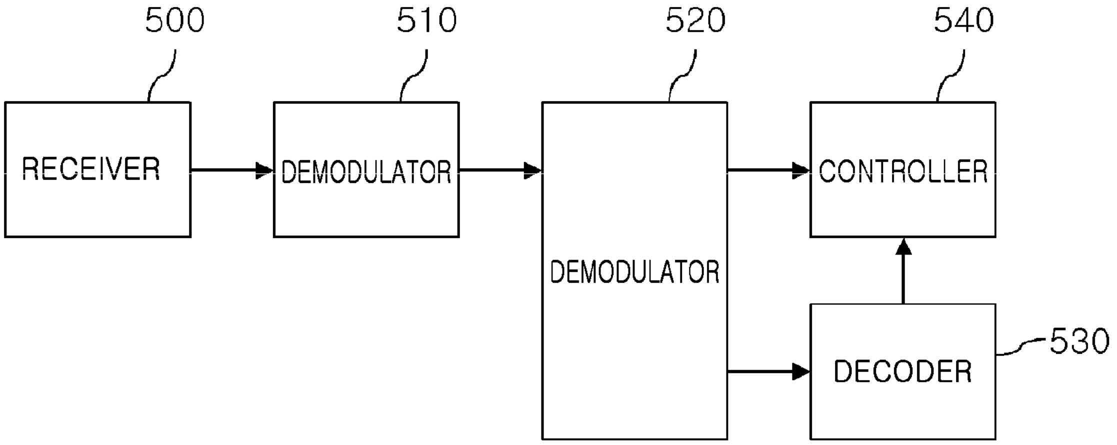
FIG. 19 is a block diagram illustrating a configuration of a broadcast signal receiving device according to a first embodiment.

FIG. 18 is a flowchart illustrating a method of receiving a broadcast signal according to a first embodiment, and the method will be described in linkage with a block diagram illustrating a configuration of the broadcast receiving device shown in FIG. 19.

Referring to FIG. 18, a receiver 500 of the broadcast receiving device receives a broadcast signal in operation S400, and a demultiplexer 520 extracts a broadcast stream, first program table information, and second program table information from the received broadcast signal in operation S410.

Additionally, the received broadcast signal is demodulated by using the demodulator 510, and then, is inputted to the demultiplexer 520, and a decoder 530 decodes the extracted first program table information and second program table information and outputs them to a controller 540.

Then, the broadcast stream is parsed using the extracted first program table information in operation S420, and the controller 540 obtains information on a group to which a plurality of programs belong by using the extracted second program table information.

According to an embodiment, the first program information may include tables according to PSI or an PSIP, and in order to represent information on RT content, i.e., a program provided through RT service, may include tables such as the MGT, VCT, EIT, ETT, RRT or STT described with reference to FIGS. 5 to 7.

Additionally, the first program information may include information on NRT content, i.e., a program provided through NRT service, and may include tables such as the SMT, NRT IT, FDT or TFT described with reference to FIGS. 9 to 12.

Additionally, the second program table information represents an association between a plurality of programs. The plurality of programs are not limited to one service, and may be provided through various services such as RT service, NRT service, and internet service.

Moreover, the second program table information may include an EGT representing information on an event group to which a plurality of programs having an association belong.

The controller 540 may obtain information on a corresponding event group described with reference to FIGS. 13 to 17 and information on a plurality of programs in the event group, from the EGT.

Figure 20:
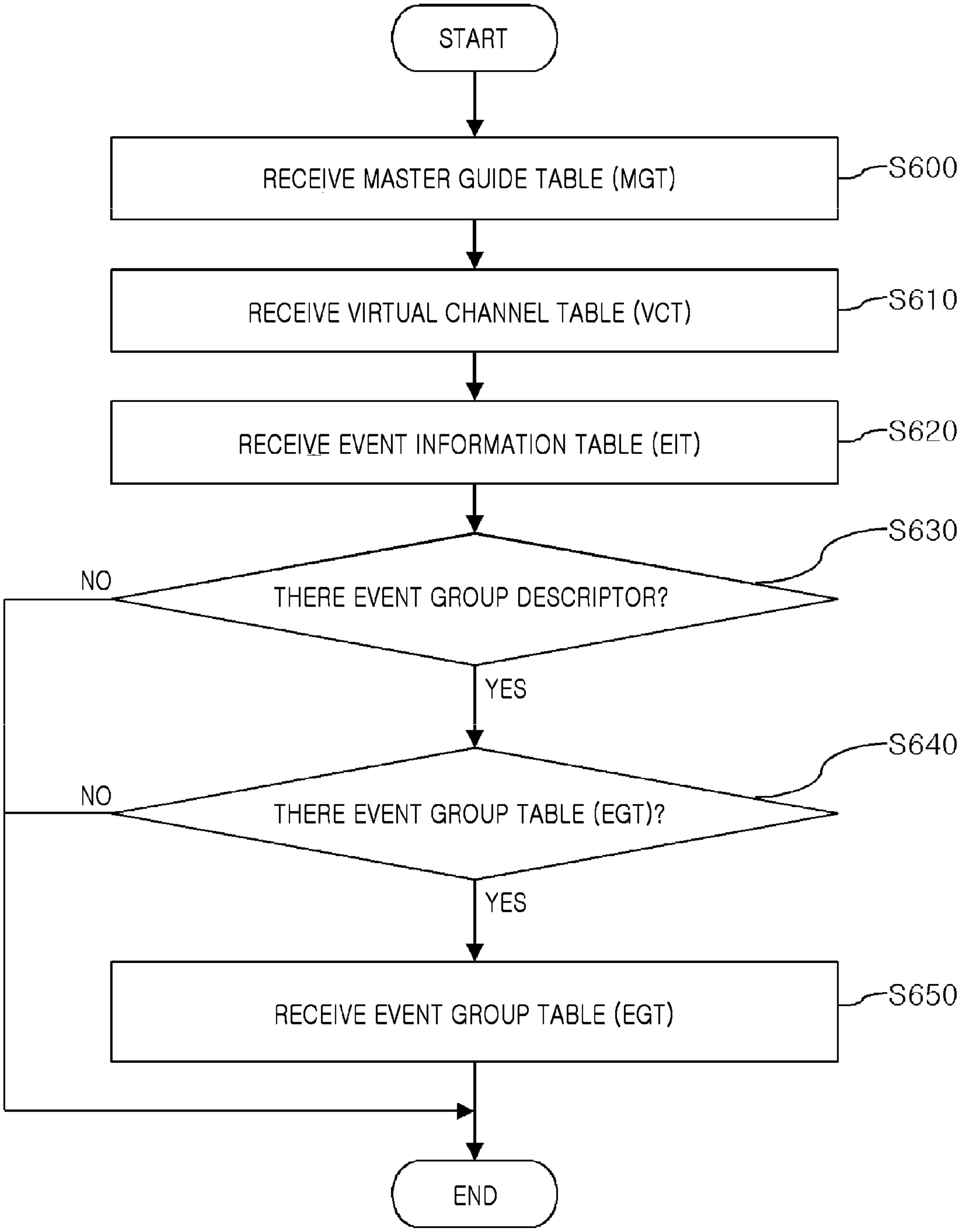
FIGS. 20 and 21 are flowcharts illustrating a method of receiving an EGT according to embodiments.

FIG. 20 is a flowchart illustrating a method of receiving an EGT according to an embodiment when table_type for an EGT is defined in an MGT as shown in FIG. 15.

Referring to FIG. 20, a broadcast receiving device receives an MGT in operation S600, receives a VCT in operation S610, and receives an EIT in operation S620.

Then, the broadcast receiving device analyzes the received EIT to confirm whether there is an EGD for each program in operation S630.

If there is the EGD, the broadcast receiving device confirms whether the PID of an EGT is in the MGT in operation S640.

If there is the PID of the EGT, the broadcast receiving device receives an EGT by using the PID of the EGT in the MGT and event_group_id in the EGD of the EIT in operation S650.

For example, if the PID of the EGT is 0x80, the filter condition for receiving the EGT may be PID=0x80, table_id=EGT, and table_id_extension=event_group_id.

Accordingly, the broadcast receiving device may receive an EGT having an EGD in the received EIT, i.e., an EGT corresponding to event_group_id stored in the EGD of the EGT.

Figure 21:
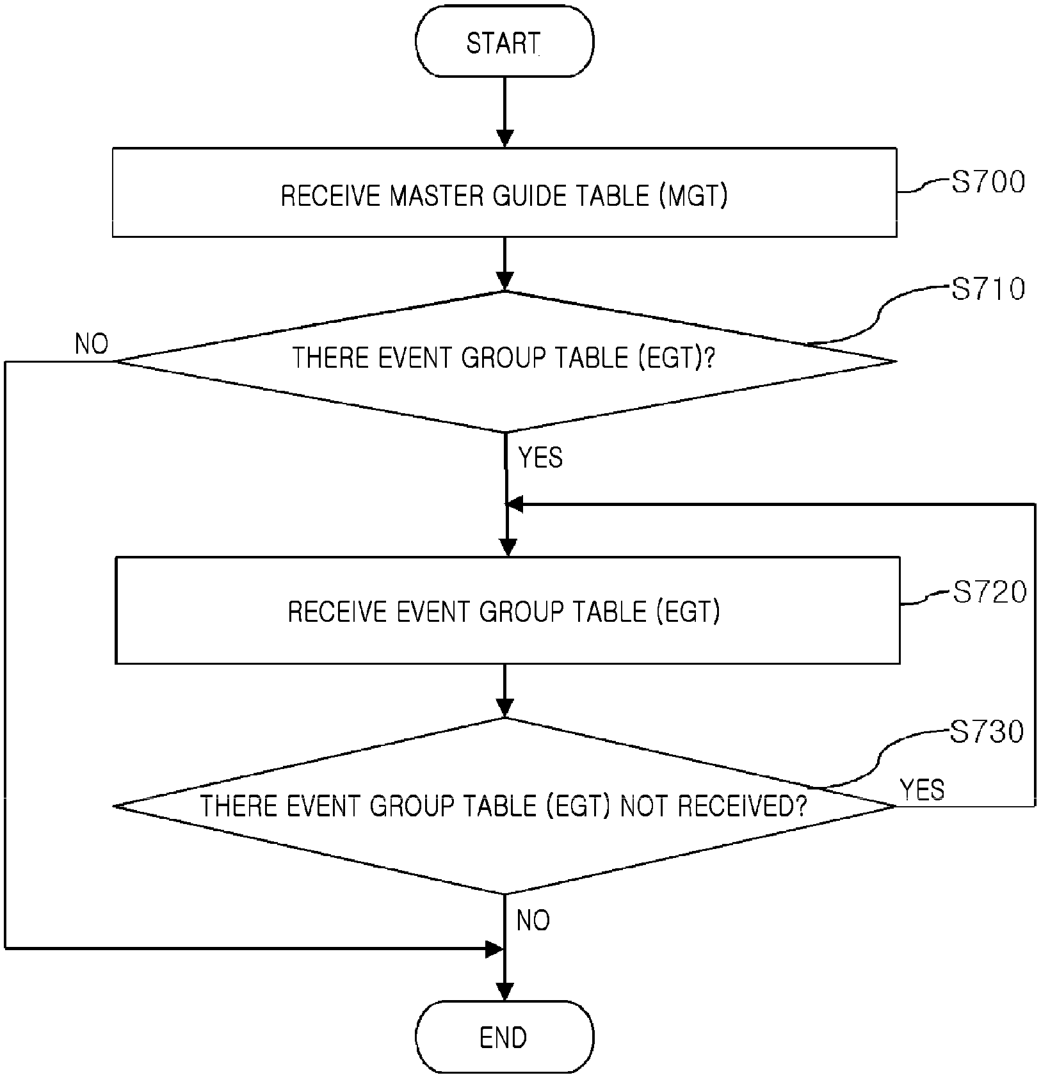

FIG. 21 is a flowchart illustrating a method of receiving an EGT according to an embodiment when a plurality of table_type for an EGT are defined in an MGT as shown in FIG. 16.

Referring to FIG. 21, the broadcast receiving device receives an MGT in operation S700, and confirms whether the PID of an EGT is in the MGT in operation S710.

If there is the PID of the EGT, the broadcast receiving device receives an EGT having the PID in operation S720, and confirms whether there is an EGT not received in operation S730.

If there is an EGT not received, the broadcast receiving device repeats operation S720 until all EGTs having the PID are received in the MGT.

In this case, once the MGT is received, all conditions for receiving the EGT may be satisfied, and accordingly, the broadcast receiving device may sequentially receive the first EGT to the last EGT by using the PIDs of an EGT in the received MGT.

For example, if the PIDs of the EGT in the MGT is 0x80 and 0x81, the broadcast receiving device receives the first EGT with a filter condition of PID=0x80, and receives the second EGT with a filter condition of PID=0x81.

Figure 22:
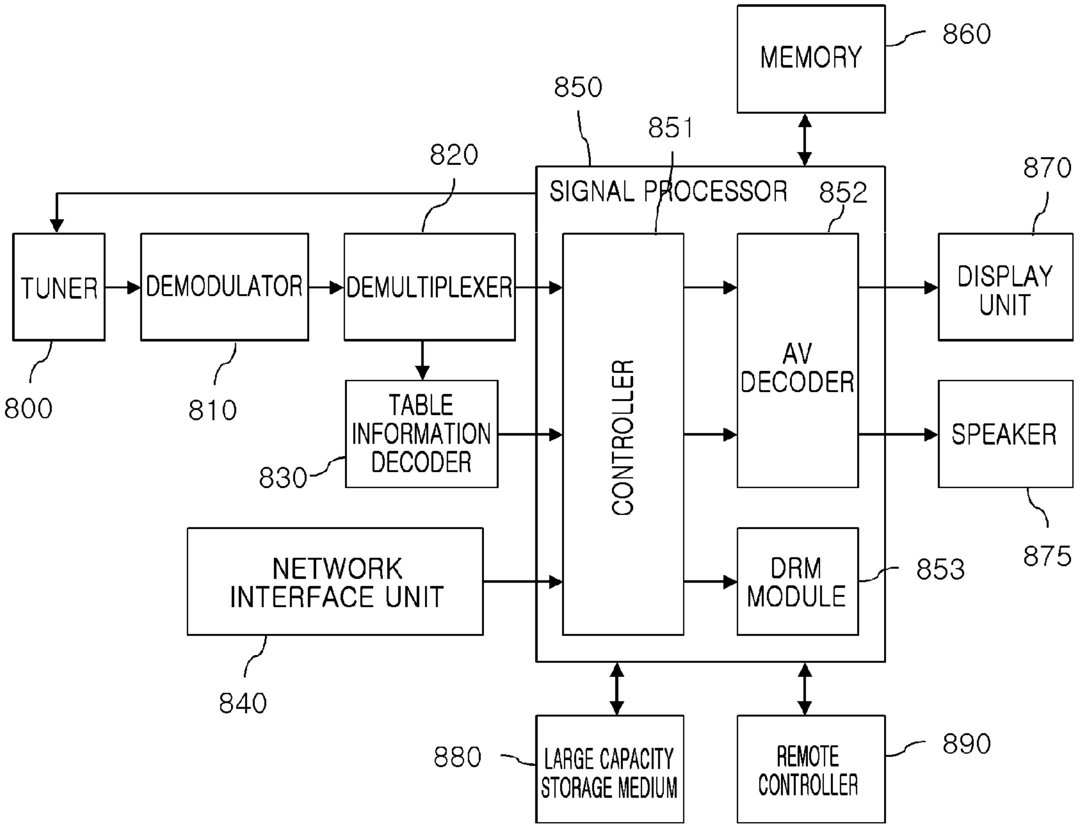
FIG. 22 is a block diagram illustrating a configuration of a broadcast signal receiving device according to a second embodiment.

FIG. 22 is a view illustrating a configuration of the broadcast receiving device according to another embodiment, and the same component in the configuration of a broadcast signal receiving device described with reference to FIGS. 3 and 19 will not be described again.

Referring to FIG. 22, a demodulator 810 demodulates a broadcast signal received though a turner 800, and a demultiplexer 820 demultiplexes a TS inputted from the demodulator 810 to extract a broadcast stream, first program table information, and second program table information.

A table information decoder 830 may decode the extracted first and second program table information to output them to the controller 851.

Additionally, a network interface unit 840 may transceive data in connection to a wire/wireless network such as internet, and for example, may download a program provided through internet service by accessing an internet server with a URL.

For this, the network interface unit 840 may include a wireless network Phy and MAC.

A controller 851 of a signal processor 850 parses a broadcast stream inputted from the demultiplexer 820 by using the decoded first program table information, for example, a PSI and PSIP table, to output video stream and audio stream.

Additionally, the controller 851 processes content data inputted from the network interface unit 840, and output the processed content data to an AV decoder 852.

The AV decoder 852 decodes and outputs the video stream and audio stream inputted from the controller 851; a display unit 870 displays an image by using the decoded video data; and a speaker 875 outputs audio by using the audio data.

According to an embodiment, the controller 852 may obtain the decoded second program data information, for example, information on an event group including a plurality of programs, by using an EGT.

Moreover, the controller 851 may include a broadcast processor (not shown) for processing a broadcast stream inputted from the demultiplexer 820, and a broadband processor (not shown) for processing content data inputted from the network interface unit 840, and may further include a channel manager (not shown) and an application manager (not shown) beside those.

Additionally, the signal processor 850 may further include an internal memory (not shown), an internal DMR module (not shown) for communicating with an external DRM module, a PVR/Progressive download unit (not shown), and an input device (not shown).

A memory 860 may include ROM, RAM, and NVRAM, and may store the first and second program table information.

The broadcast receiving device may include a high capacity storage medium 880, and for example, the high capacity storage medium 880 may store contents received through NRT service.

Furthermore, a remote controller 890 may control an operation of the broadcast receiving device at a user's input.

Figure 23:
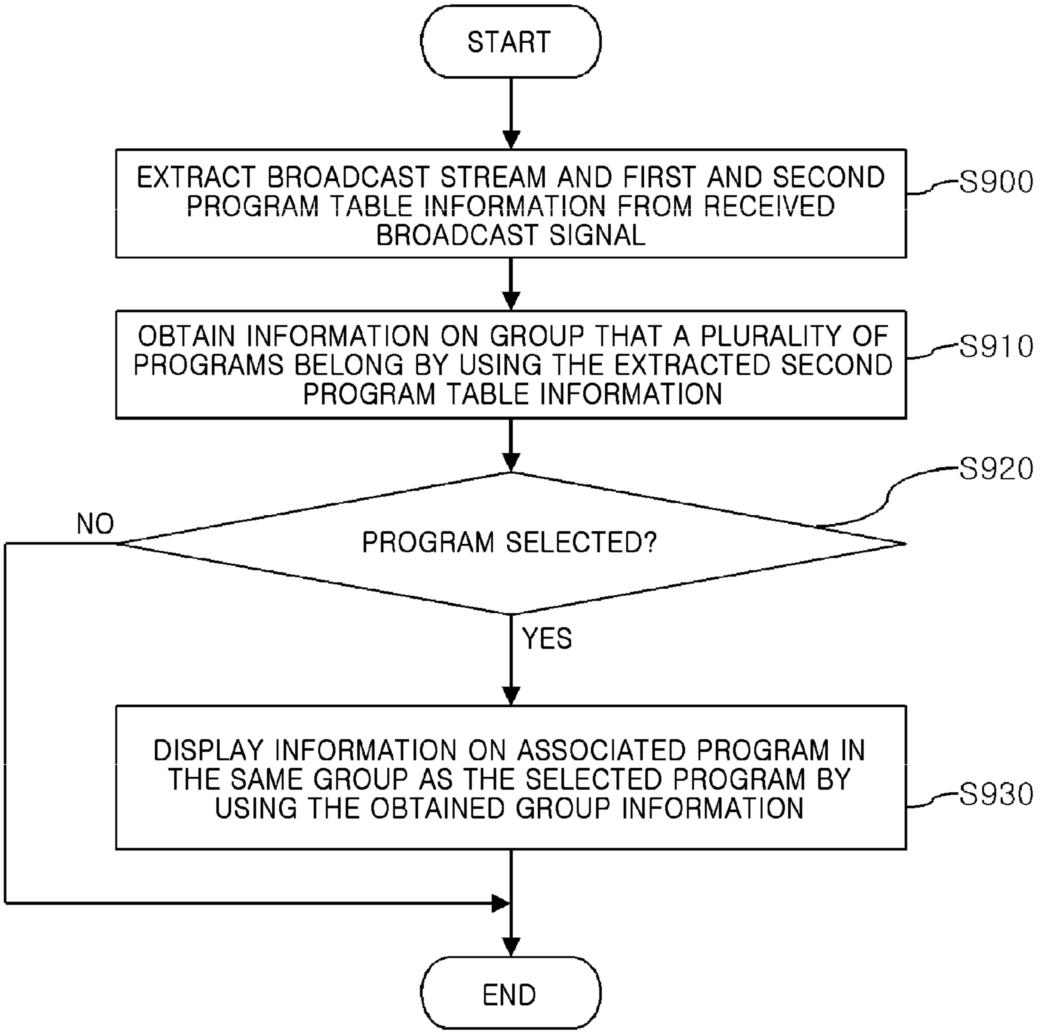
FIG. 23 is a flowchart illustrating a method of receiving a broadcast signal according to a second embodiment.

FIG. 23 is a flowchart illustrating a method of receiving a broadcast signal according to second embodiment, and overlapping contents described with reference to FIGS. 18 to 22 will be omitted.

Referring to FIG. 23, the broadcast receiving device extracts a broadcast stream, first program table information, and second program table information from the received broadcast signal in operation S910, and obtains information on a group to which a plurality of programs belong by using the extracted second program table information in operation S910.

For example, the first program information may include tables according to PSI or a PSIP, and in more detail, may include tables such as the MGT, VCT, EIT, ETT, RRT, STT, SMT, NRT IT, FDT or TFT.

Moreover, the second program table information may include an EGT representing information on an event group to which a plurality of programs having an association belong.

Then, when one of the plurality of programs is selected in operation S920, the broadcast receiving device displays information on an associated program in the same group as the selected program by using the obtained group information in operation S930.

Hereinafter, a configuration of a user interface (UI) representing an association between programs according to an embodiment will be described in detail with reference to FIGS. 24 to 33.

Figure 24:
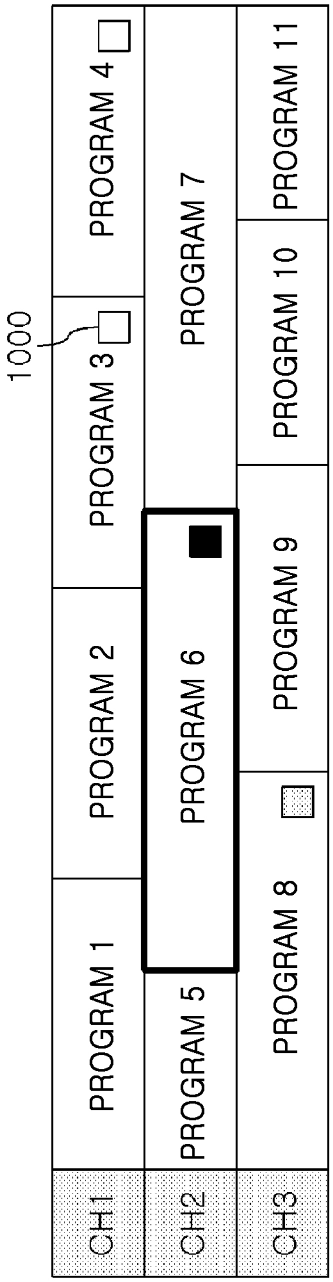
FIGS. 24 and 25 are views illustrating a method of displaying associated program information by using group information obtained using an EGT according to embodiments.

Referring to FIG. 24, a display unit 870 of the broadcast receiving device may display an EPG including information on a plurality of programs on the screen.

Moreover, the displayed EPG may include the first program information, for example, the above mentioned PSI and PSIP tables, and information on programs provided through RT service on the basis of the current time.

A user may select one program from a program list displayed on the EPG to perform viewing, scheduled viewing, or scheduled recording on a corresponding program.

According to an embodiment, the EPG may display group information on programs included by using an image including characters or symbols.

Referring to FIG. 24, a specific form of an image may be displayed in order to correspond to each program in an event group among programs on the EPG.

For example, a symbol 1000 representing a program in an event group may be displayed in correspondence to "program 3", "program 4", "program 6", and "program 8".

Additionally, the symbol 1000 may be displayed in a different form or color according to an event group to which a corresponding program belongs, and accordingly, event groups may be distinguished from each other on the EPG.

As shown in FIG. 24, if "program 3" and "program 4" are in the same event group, symbols having the same first color, for example, blue color, may be displayed at "program 3" and "program 4" on the EPG, respectively.

For example, in the case of "program 6" in a different event group than "program 3" and "program 4", a symbol having a different second color than the first color, for example, black color, may be displayed.

Furthermore, in relation to "program 8" in a different event group than "program 3", "program 4", and "program 6", a symbol having a different third color than the first and second colors, for example, red color, may be displayed.

Figure 25:
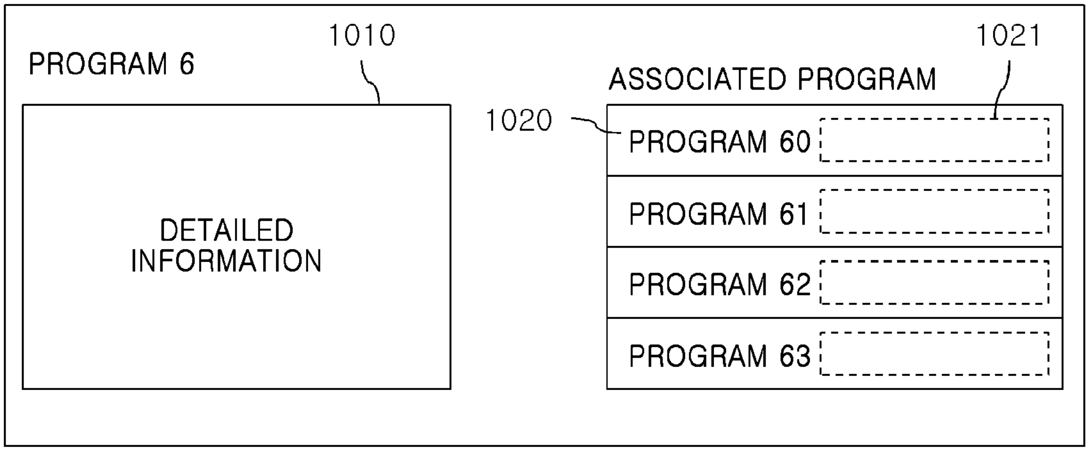

Referring to FIG. 25, when a user selects a specific program, the display unit 870 of the broadcast receiving device may display on the screen information on at least one associated program in the same group as the selected program.

For example, when "program 6" is selected from the EPG of FIG. 24, detailed information 1010 on the selected "program 6" may be displayed on the screen as shown in FIG. 25.

Additionally, the detailed information 1010 on "program 6" may be displayed using the first program table information, for example, the EIT or ETT.

Furthermore, when the selected "program 6" belongs to the event group, information on associated programs belonging to the same event group as the "program 6" may be displayed in addition to the detailed information 1010 on program 6.

If "program 6", "program 60", "program 61", "program 62", and "program 63" belong to a specific event group, according to the selection of "program 6", each information on "program 60", "program 61", "program 62", and "program 63", i.e., associated programs belonging to the same event group as "program 6", may be displayed on the screen.

The associated programs may include a program using RT service such as "program 6" selected from the EPG, and contents provided through various services such as NRT service or internet service.

Additionally, the group information and information on programs belonging to a corresponding group may be obtained from the second program table information, for example, the EGT.

According to an embodiment, the display unit 870 of the broadcast receiving device may display current status information 1021 on the associated program.

The current status information on the associated program may represent information on currently available service in relation to a corresponding program, and for example, the associated program may have one current status of viewing available, scheduling available, and viewing/scheduling unavailable.

Figure 26:
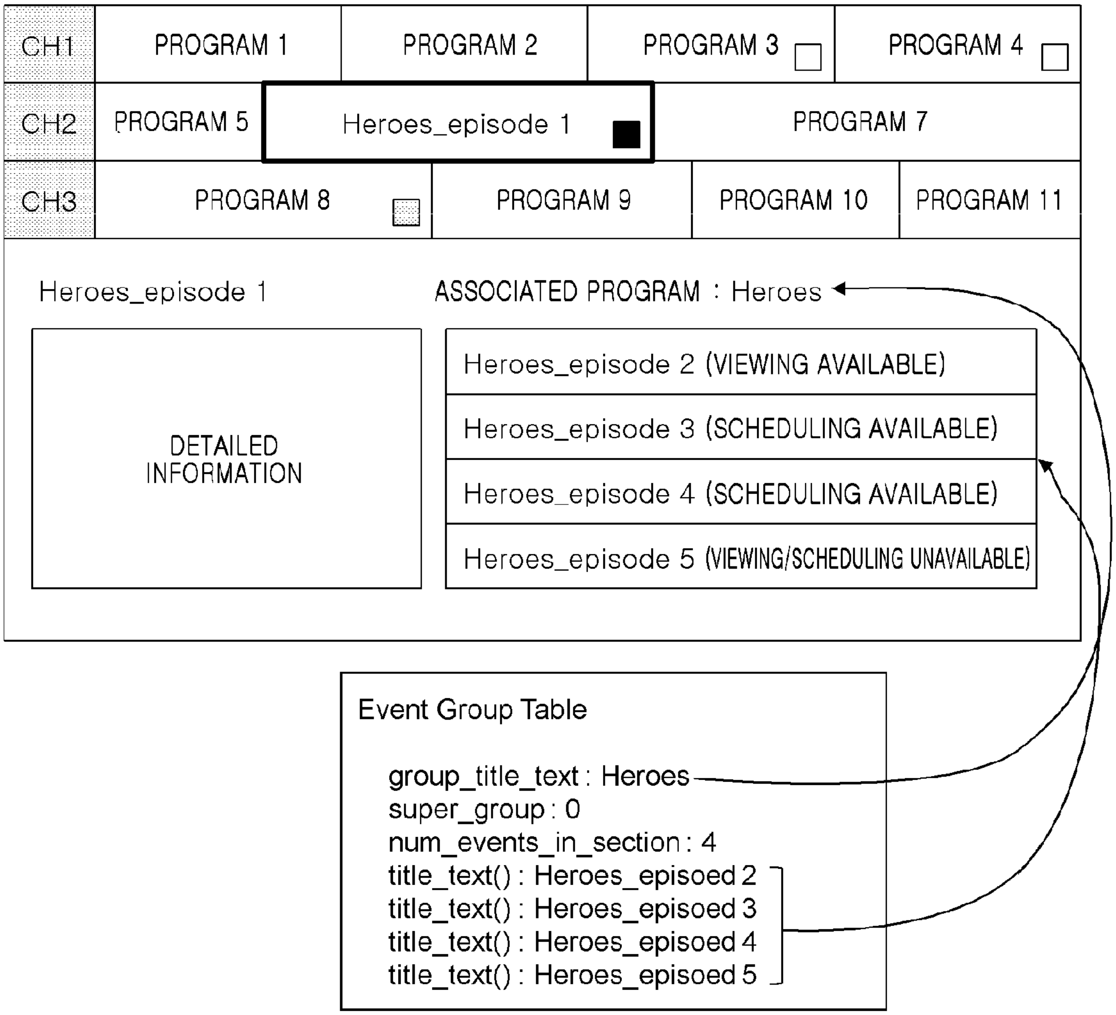
FIG. 26 is a flowchart illustrating a method of determining a current status of an associated program according to an embodiment.

Referring to FIG. 26, when a user selects Heroes_episode 1 from the EPG on the screen, detailed information on the selected Heroes_episode 1, and associated programs belonging to the same event group as Heroes_episode 1, i.e., Heroes_episode 2, Heroes_episode 3, Heroes_episode 4, and Heroes_episode 5, may be displayed on the screen in addition to the EPG.

Information that five programs, i.e., "Heroes_episode 1" to "Heroes_episode 5", belong to the same group may be obtained from the EGT of FIG. 26.

For example, "Heroes" representing an association between the five programs may be displayed using group_title_text of the EGT and the titles of the associated programs may be displayed using title_text of the EGT.

Additionally, current status information on each associated program may be displayed with one of "viewing available", "scheduling available", and "viewing/scheduling unavailable", but the present invention is not limited thereto. The current status information may represent a current status for various operations that the programs may perform.

The "viewing available" represents that viewing is currently available for a corresponding program; "scheduling available" represents that current viewing is unavailable but scheduled viewing or scheduled recording are available at present; and the "viewing/scheduling unavailable" represents that viewing/scheduling is unavailable, and there is no operation for a corresponding program.

For example, as shown in FIG. 26, a user may select "Heroes_episode 2" of an associated program to view it immediately, and may select "Heroes_episode 3" or "Heroes_episode 4" to make scheduled viewing or recording at a desired time. But, "Heroes_episode 5" cannot be selected for the above operation.

Additionally, when a program highlighted for selection on the EPG at the top of the screen is changed according to an up, down, left, and right move command of a user, detailed information and associated program information displayed at the bottom of the screen may be changed in synchronization with a change of the highlighted program.

According to an embodiment, a broadcast receiving device may determine a current status of the associated program according to a predetermined priority.

Figure 27:
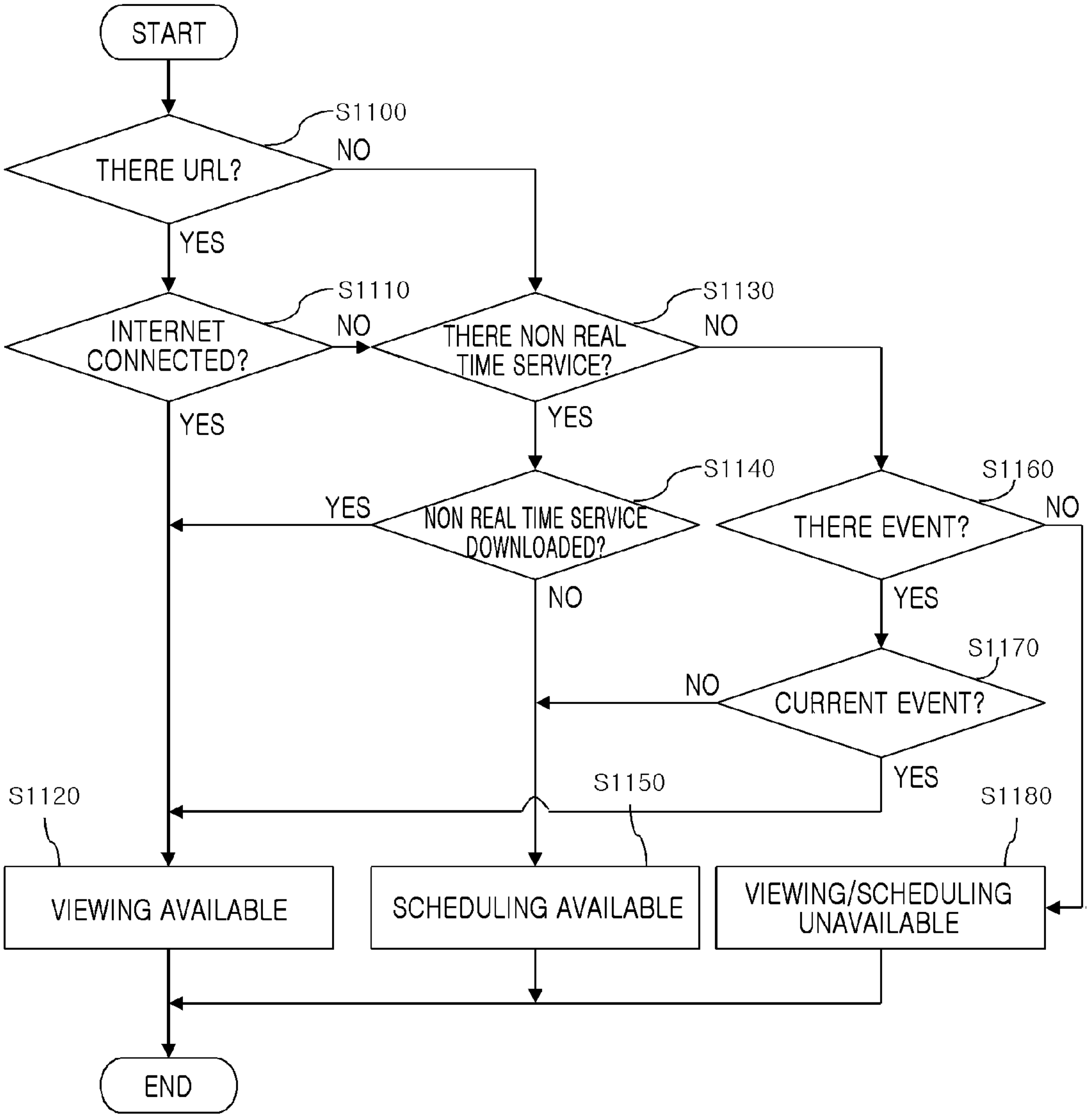

FIG. 27 is a flowchart illustrating a method of determining a current status of an associated program when the priority is set according to whether viewing is available for a user.

Referring to FIG. 27, the broadcast receiving device confirms whether there is a URL for a corresponding associated program in operation S1100.

Moreover, the broadcast receiving device may confirm there is a URL for downloading the associated program by using link information on EGT, in more detail, link_media as shown in FIG. 13.

If there is the URL, the broadcast receiving device confirms current internet connection in operation S1110, and if it is connected to internet, determines a current status of the associated program as "viewing available" in operation S1120.

Moreover, if there is no URL or internet connection, the broadcast receiving device confirms whether there is an NRT service for a corresponding associated program in operation S1130.

For example, whether there is the NRT service may be confirmed b using link information on the associated program in the EGT, and in more detail, the broadcast receiving device may confirm whether there is link_media having a value for representing NRT service in correspondence to the program.

If there is the NRT service, the broadcast receiving device confirms whether a corresponding associated program is already downloaded using the NRT service in operation S1140, and if the corresponding associated program is already downloaded, determines a current status of the associated program as "viewing available" in operation S1120.

Moreover, if the associated program is not downloaded, the broadcast receiving device determines a current status of the associated program as "scheduling available" in operation S1150.

If there is no NRT service in operation S1130, the broadcast receiving device confirms whether there is an event for providing a corresponding associated program through RT service in operation S1160.

For example, whether there is the event may be confirmed by using link information on the associated program in the EGT, and in more detail, the broadcast receiving device may confirm whether there is link_media having a value for representing RT service in correspondence to the program.

If there is the event, the broadcast receiving device confirms whether a corresponding associated program is a current event that is provided immediately through RT service in operation S1170, and if it is an current event, determines a current status of the associated program as "viewing available" in operation S1120.

Moreover, if the associated program is not a current event, the broadcast receiving device determines a current status of the associated program as "scheduling available" in operation S1150.

Moreover, if there is no event for a corresponding associated program in operation S1160, the broadcast receiving device determines a current status of the associated program as "viewing/scheduling unavailable" in operation S1180.

The method of determining a current status of an associated program described with reference to FIG. 27 is just one embodiment of the present invention. The broadcast receiving device sets a priority according to various standards such as quality, costs, reception speed, and user preference in order to determine a current status of the associated program.

FIGS. 28 to 33 are views illustrating a method of displaying associated program information according to different embodiments.

Figure 28:
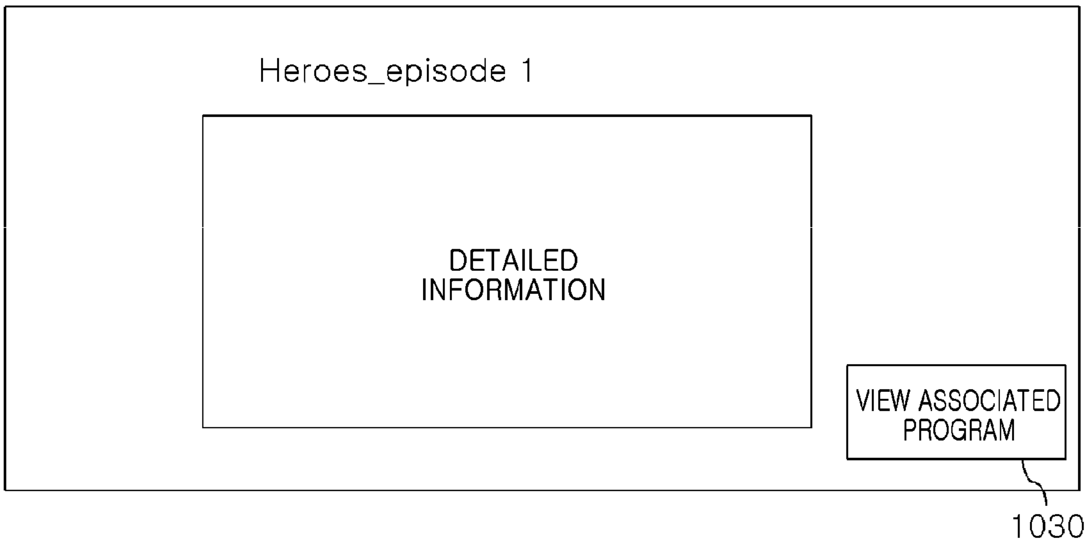

Referring to FIG. 28, when a user selects "Heroes_episode 1" on an EPG, detailed information on the selected "Heroes_episode 1" is displayed, and a button 1030 for "view associated program" is displayed in order to display information on associated programs on the screen in addition to the detailed information.

Figure 29:
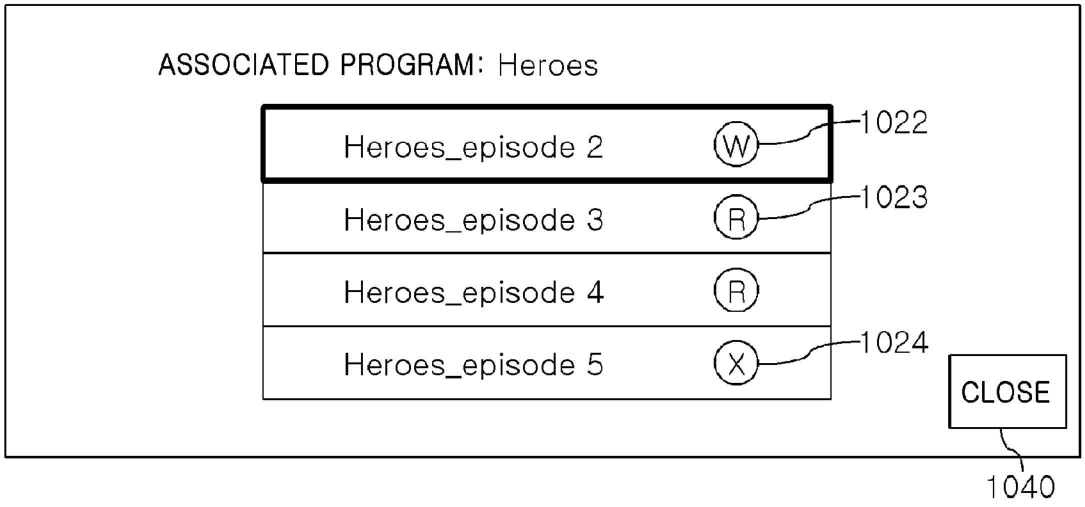

When a user selects the button 1030 for "view associated program", as shown in FIG. 29, information on associated programs belonging to the same event group as "Heroes_episode 1", for example, "Heroes_episode 2", "Heroes_episode 3", "Heroes_episode 4", and "Heroes_episode 5", may be displayed on the screen.

Additionally, when a user selects a button 1040 for "close", displaying the associated program information is terminated, and the detailed information on "Heroes_episode 1" may be displayed again on the screen as shown in FIG. 28.

Referring to FIG. 29, current status information on an associated program may be displayed with an icon.

For example, a first icon 1022 having a "W" character represents "viewing available"; a second icon 1023 having an "R" character represents "scheduling available"; and a third icon 1024 having an "X" character represents "viewing/scheduling unavailable".

Current status information on the associated program may be delivered to a user through various methods besides the text or icon.

Figure 30:
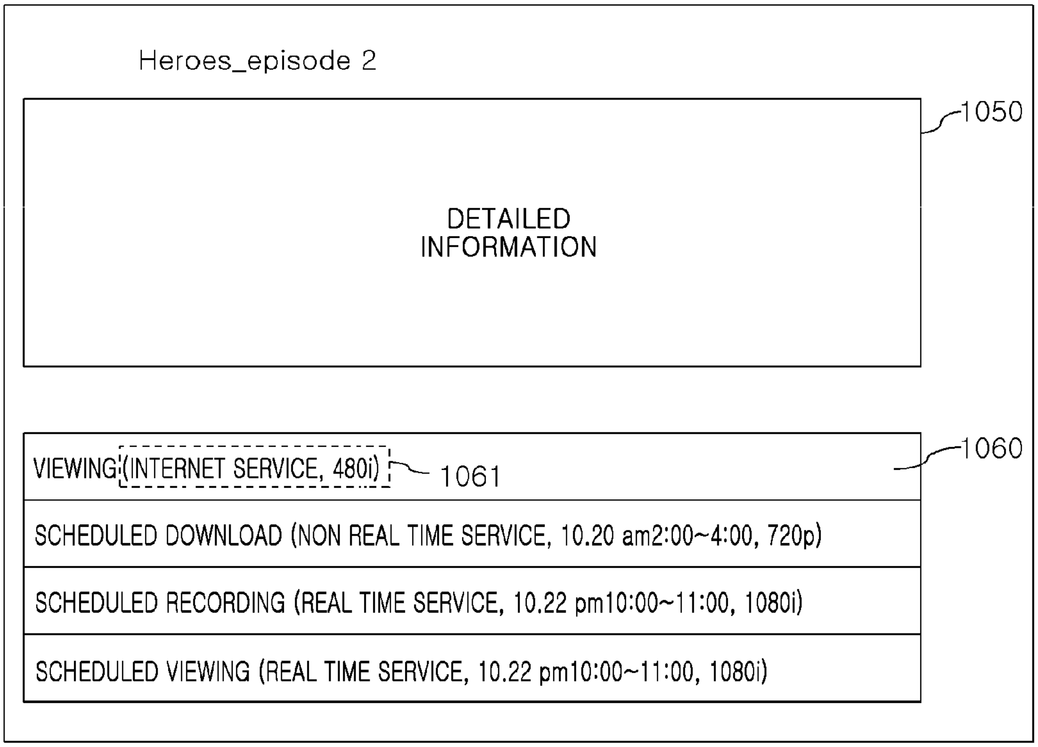

FIG. 30 is a view illustrating information displayed on the screen when a user selects an associated program.

Referring to FIG. 30, when a user selects one program from associated programs displayed on the screen, information 1060 on the selected associated program may be displayed on the screen.

For example, when a user selects an associated program "Heroes_episode 2" on the screen of FIG. 29, the information 1060 on a user selectable method for the selected "Heroes_episode 2" may be displayed on the screen.

Moreover, the information 1060 on the reception method may include detailed information 1061 on a corresponding method, for example, types of services for a corresponding reception method and a content attribute such as resolution.

As shown in FIG. 30, the selected associated program "Heroes_episode 2" may be provided through four methods such as viewing, scheduled downloading, scheduled recording, and scheduled viewing.

In more detail, a user may immediately view "Heroes_episode 2" with 480i resolution through internet service, or make a schedule to download "Heroes_episode 2" with 720p resolution during 2:00 to 4:00 on October 20th through NRT service, or make a scheduled recording or scheduled viewing on "Heroes_episode 2" with 1080i resolution provided through RT service.

Moreover, after confirming information relating to a reception method as shown in FIG. 30, a user may directly select a desired operation on the associated program "Heroes_episode 2".

According to another embodiment, the above event group may be edited by a user.

For example, a user may exclude one of a plurality of programs in a specific event group from the event group, or may add a desired program to a specific event group.

Additionally, as mentioned above, when a user edits an event group, its edited content may be reflected on the program table information, for example, the EGT, EIT, and NRT IT, so that a corresponding table may be edited.

Figure 31:
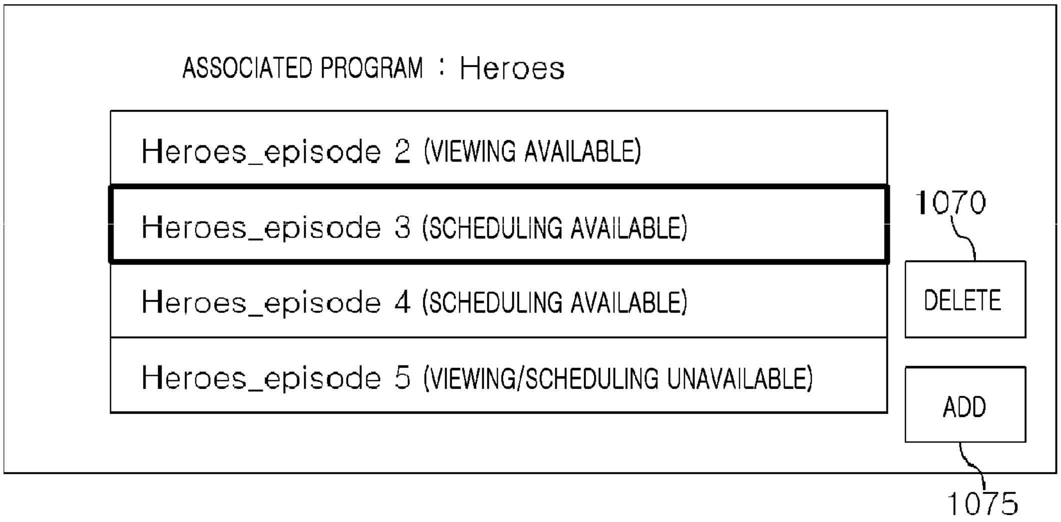

Referring to FIG. 31, after selecting one, for example, "Heroes_episode 3", from associated programs belonging to the same event group as "Heroes_episode 1", a user may select a button 1070 for "delete", and accordingly, "Heroes_episode 3" may be excluded from the event group.

In this case, as shown in FIG. 32, information on the excluded "Heroes_episode 3" may be deleted from the EGT, and related field values may be edited.

Additionally, as in the EIT or NRT IT including information on "Heroes_episode 3", information on the EGT, for example, an EGD having corresponding event_group_id, may be deleted.

Furthermore, a user may select a button 1075 for "add" to add "Heroes_episode 1" and a desired program to an event group to which the displayed associated programs belong.

For example, a user selects the button 1075 for "add" and then inputs information on "Heroes_episode 6", i.e., a program to be added. Therefore, "Heroes_episode 6" may be added to the event group.

In this case, as shown in FIG. 33, information on the added "Heroes_episode 6" may be added to the EGT and related field values may be modified.

Additionally, information on the EGT, for example, an EGD having corresponding event_group_id, may be added to the EIT or NRT IT including information on "Heroes_episode 6".

The method of receiving a broadcast signal according to an embodiment may be applicable to an intelligent image display device having a computer supporting function in addition to a broadcast receiving function, for example, network TVs, HBBTVs, or smart TVs.

The intelligent image display device is faithful to a broadcast receiving function and further includes an internet function, so that easy to use interfaces such as a handwriting-type input device, a touch screen, or a spatial remote controller may be provided. Also, with a wire/wireless internet function, the intelligent display device may be connected to internet or a computer, so that functions such as e-mail, web browsing, banking, or gaming become possible. For these various functions, standardized general OS may be used.

Additionally, the intelligent image display device may perform user-friendly various functions as various application are freely added or deleted on a general OS kernel, for example.

Figure 34:
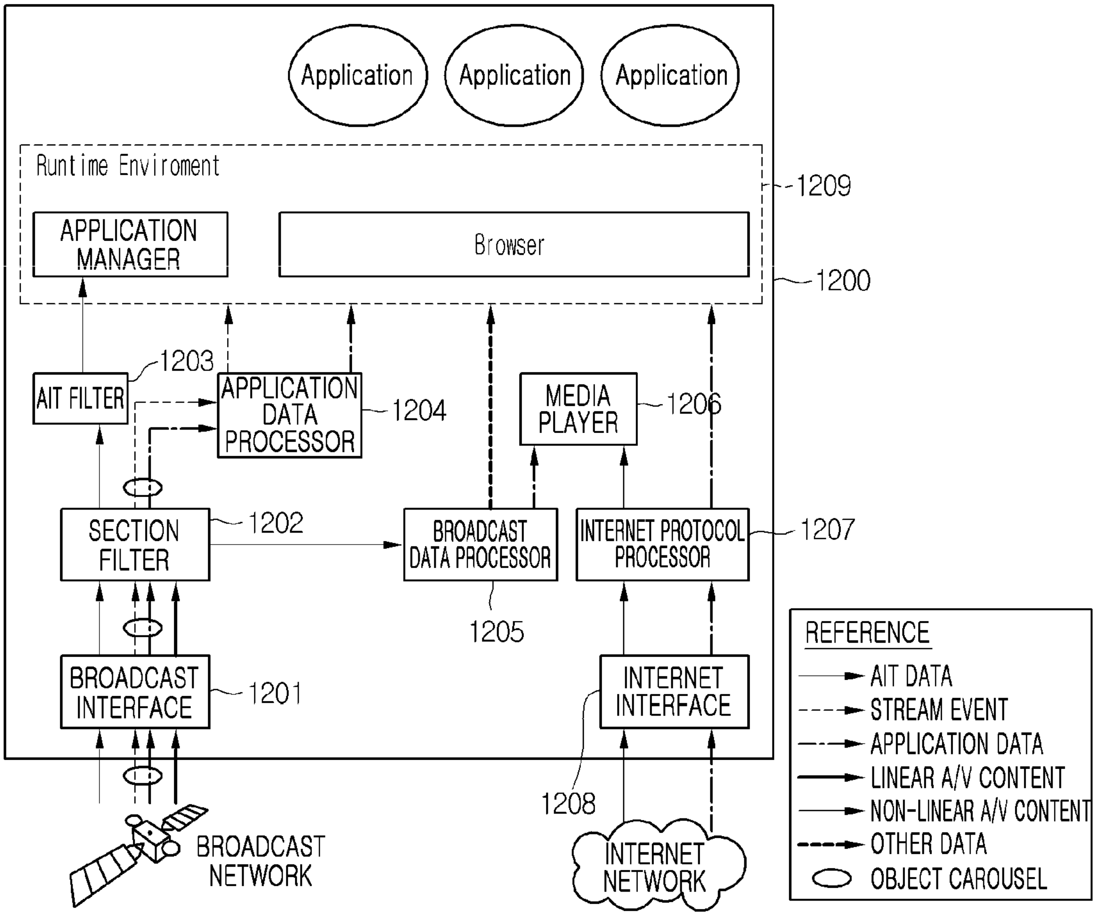
FIG. 34 is a block diagram illustrating a configuration of a broadcast signal receiving device according to an embodiment.

FIG. 34 is a block diagram illustrating a configuration of a broadcast signal receiving device according to a third embodiment, i.e., an embodiment of the above intelligent image display device.

Referring to FIG. 34, a broadcast receiving device 1200 may be connected to a broadcast network and internet network.

For example, the broadcast receiving device 1200 may include a broadcast interface 1201, a section filter 1202, an AIT filter 1203, an application data processor 1204, a broadcast data processor 1205, a media player 1206, an internet protocol processor 1207, an internet interface 1208, and a runtime module 1209.

For example, the broadcast interface 1201 of the broadcast receiving device 1200 may receive Application Information Table (AIT) data, real-time broadcast content, application data or an stream event, and the real-time broadcast content may be Linear A/V Content.

The section filter 1202 performs section filtering on four data received through the broadcast interface 1201 to transmit AIT data to the AIT filter 1203, transmits Linear A/V Content to the broadcast data processor 1205, and transmits a stream event and application data to the data processor 1204.

The internet interface 1208 may receive Non-Linear A/V Content and application data, and for example, the Non-Linear A/V Content may be Content On Demand application.

Additionally, the Non-Linear A/V Content may be transmitted to the media player 1206, and the application data may be transmitted to the runtime module 1209.

Additionally, the runtime module 1209 may include an application manager and a browser. The application manager may control a life cycle for interactive application by using AIT data, and the browser may display and process the interactive application.

FIGS. 35 to 40 are views illustrating a method of displaying associated program information according to other embodiments, and overlapping contents described with reference to FIGS. 23 to 33 will be omitted.

The method of displaying associated program information described with reference to FIGS. 35 to 40 may be applied to the intelligent image display device such as smart TVs.

Figure 35:
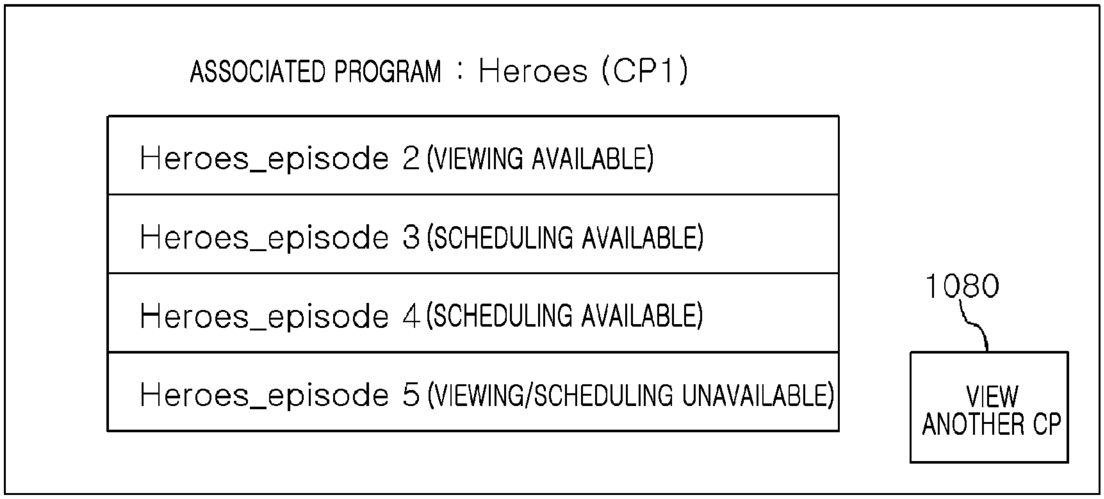
FIGS. 35 to 40 are views illustrating a method of displaying associated program information according to other embodiments.

Referring to FIG. 35, information on associated programs belonging to the same event group as "Heroes_episode 1" selected on the EPG of FIG. 24 may be displayed on the screen, and the associated program displayed on the screen may be provided from a Contents Provider (CP), for example, "CP1".

Additionally, if a user selects a button 1080 for "view another CP" displayed on the screen, related programs provided from different CPs than "CP1" may be displayed on the screen.

Figure 36:
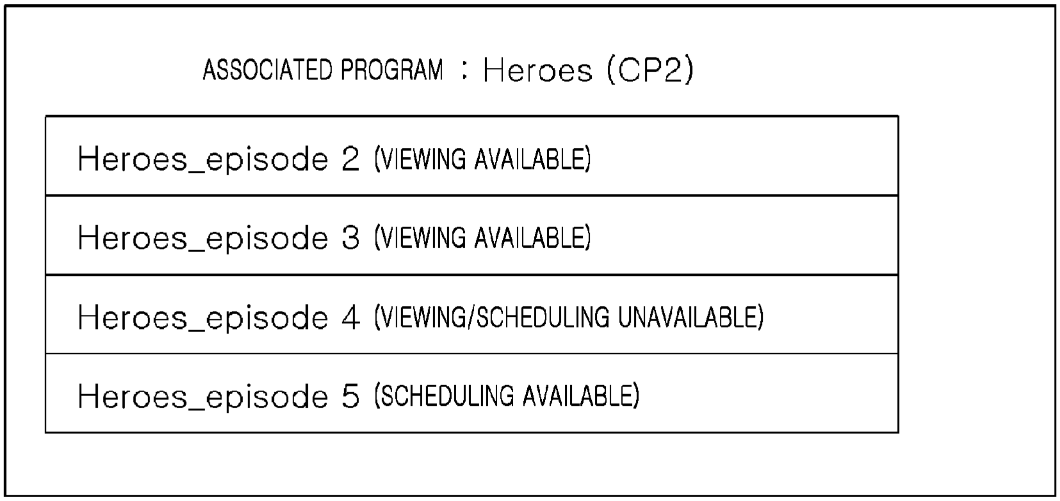

Referring to FIG. 36, if a user selects the button 1080 for "view another CP", related programs provided from "CP2" may be displayed on the screen.

The information on associated programs as shown in FIG. 36 may be obtained from a program table information provided from "CP2", for example, an EGT.

Moreover, if a user selects the button 1080 for "view another CP" on the screen of FIG. 36, another CP that provides a similar event group to a corresponding event group may be searched. For example, the "CP2" that provides the similar event group may be searched by comparing the titles of event groups provided from another CP with "Heroes", i.e., the title of the event group.

Figure 37:
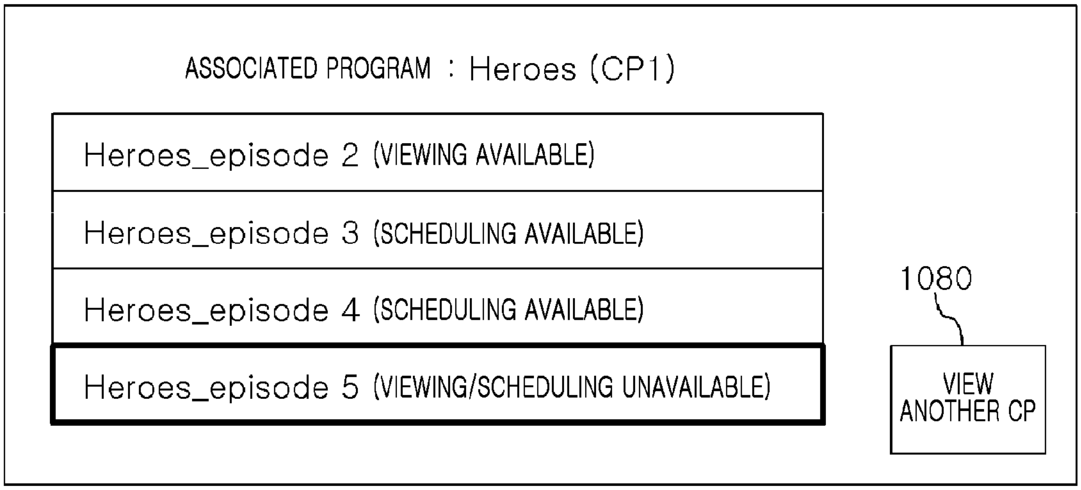

Referring to FIG. 37, a user may select one from associated programs displayed on the screen, and then, may select the button 1080 for "view another CP", and accordingly, information on other CPs that provide the selected associated program may be displayed on the screen.

Figure 39:
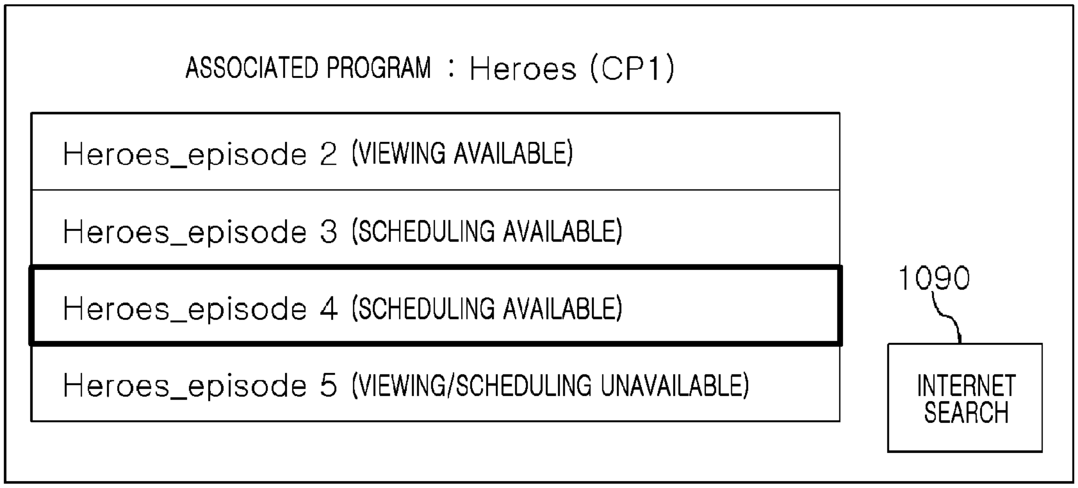

For example, when a user selects "Heroes_episode 5" in a "viewing/scheduling unavailable" status and then selects the button 1080 for "view another CP", as shown in FIG. 39, information on "CP2", "CP3", and "CP4", i.e., CPs that provide "Heroes_episode 5", may be displayed on the screen.

Figure 38:
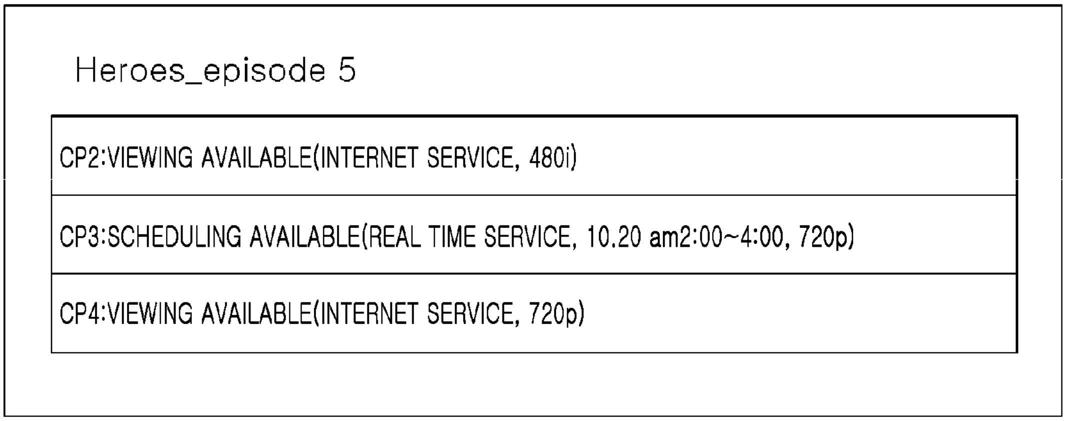

Referring to FIG. 38, "CP2" may provide "Heroes_episode 5" with 480i resolution to a user through internet service in order to view it immediately. "CP3" may provide "Heroes_episode 5" with 720p resolution to a user through RT service in order to make scheduled viewing or scheduled recording during 2:00 to 4:00 on October 20th. "CP4" provides "Heroes_episode 5" with 720p resolution to a user through internet service to be viewed immediately.

Accordingly, a user may receive "Heroes_episode 5", which is unavailable for viewing or scheduling by "CP1", from selected one from other CPs such as "CP2", "CP3", and "CP4".

Referring to FIG. 39, a user may select one from associated programs displayed on the screen, for example, "Heroes_episode 4", and then may select a button 1090 for "internet search". Accordingly, a web page or server that downloads "Heroes_episode 4" via internet may be searched.

Figure 40:
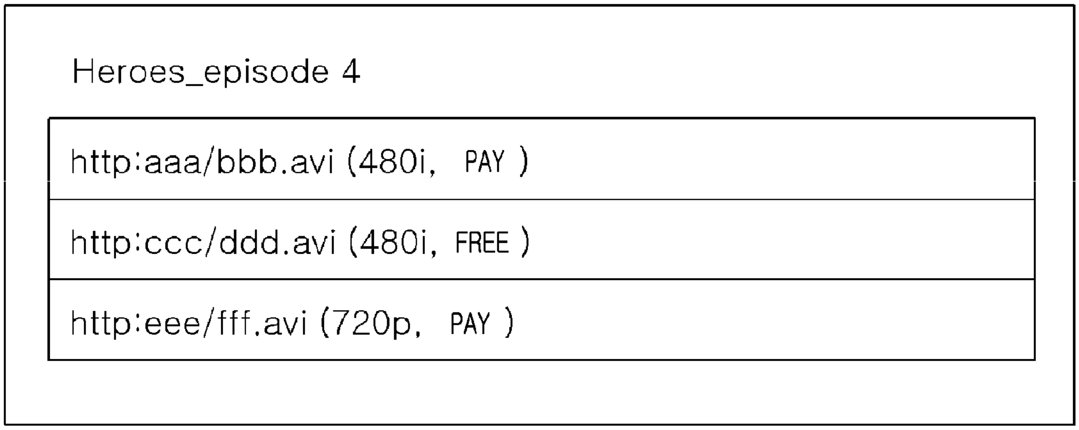

In this case, as shown in FIG. 40, the search result may be displayed on the screen, and may include URLs for downloading "Heroes_episode 4".

Furthermore, an attribute of "Heroes_episode 4" downloaded from a corresponding URL, for example, resolution and download cost, may be displayed on the screen in correspondence to each URL.

Examples of the computer readable recording medium include read-only memory (ROM), random-access memory (RAM), CD-ROMs, magnetic tapes, floppy disks, and optical data storage devices.

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure.

The invention claimed is:

1. A method of transmitting a broadcast signal, comprising:

generating a broadcast stream, event information including information on an event, and association information including information on one or more associated contents which are associated with the event, wherein the one or more associated contents are signaled by a NRT-TI;

constituting a stream including the broadcast stream, the event information and the association information; and transmitting the constituted stream, wherein the association information includes information representing the number of one or more links for receiving the one or more associated contents and one or more pieces of link information for the one or more links, wherein the one or more pieces of link information correspond to the one or more links, respectively, wherein the association information includes a identifier for NRT service including the one or more associated contents, wherein the association information includes a content linkage for identifying the each of the one or more associated contents, wherein the identifier for NRT service matches a identifier for NRT service included in the NRT-IT and the content linkage matches a content linkage included in the NRT-IT.

2. The method according to claim 1, wherein association information includes a link byte field representing a identifier of the corresponding link.

3. The method according to claim 1, wherein the association information includes a link length field representing a length of the corresponding link.

4. The method according to claim 1, wherein the each of the one or more pieces of link information includes a link media field representing an access path for the corresponding link.

5. The method according to claim 1, wherein event information includes a name of the event and a start time of the event.

6. A method of receiving a broadcast signal, comprising:

receiving the broadcast signal;

demodulating the received broadcast signal;

demultiplexing, from the demodulated broadcast signal, a broadcast stream, event information including information on an event, and association information including information on one or more associated contents which are associated with the event, wherein the one or more associated contents are signaled by a NRT-IT, wherein the association information includes information representing the number of one or more links for receiving the one or more associated contents and one or more pieces of link information for the one or more links, wherein the one or more pieces of link information correspond to the one or more links, respectively, wherein the association information includes a identifier for NRT service including the one or more associated contents, wherein the association information includes a content linkage for identifying the each of the one or more associated contents, wherein the identifier for NRT service matches a identifier for NRT service inducted in the NRT-IT and the content linkage matches a content linkage included in the NRT-IT.

7. The method according to claim 6, wherein the each of the one or more pieces of link information includes a link byte field representing a identifier of the corresponding link.

8. The method according to claim 6, wherein the association length field representing a length of the corresponding link.

9. The method according to claim 6, wherein the association information includes a link media field representing an access path for the corresponding link.

10. The method according to claim 6, wherein event information includes a name of the event and a start time of the event.

11. A broadcast signal receiving device comprising:

a receiver for receiving the broadcast signal;

a demodulator for demodulating the received broadcast signal;

a demultiplexer for extracting a broadcast stream, event information including information on an event, and association information including information on one or more associated contents which are associated with the event, wherein the one or more associated contents are signaled by a NRT-IT;

wherein the association information includes information representing the number of one or more links for receiving the one or more associated contents and one or more pieces of link information for the one or more links, wherein the one or more pieces of link information correspond to the one or more links, respectively, wherein the association information includes a identifier for NRT service including the one or more associated contents, wherein the association information includes a content linkage for identifying the each of the one or more associated contents, wherein the identifier for NRT service matches a identifier for NRT service included in the NRT-IT and the content linkage matches a content linkage included in the NRT-IT.

* * * * *